(12) United States Patent
Thibaut et al.

(10) Patent No.: US 11,233,388 B2
(45) Date of Patent: Jan. 25, 2022

(54) METHOD AND POWER DISTRIBUTION UNIT FOR LIMITING A TOTAL DELIVERED POWER

(71) Applicant: OVH, Roubaix (FR)

(72) Inventors: Christophe Maurice Thibaut, Houplin Ancoisne (FR); Miroslaw Piotr Klaba, Roubaix (FR)

(73) Assignee: OVH, Roubaix (FR)

( * ) Notice: Subject to any disclaimer, the term of this patent is extended or adjusted under 35 U.S.C. 154(b) by 48 days.

(21) Appl. No.: 16/505,990

(22) Filed: Jul. 9, 2019

(65) Prior Publication Data
US 2020/0021106 A1    Jan. 16, 2020

(30) Foreign Application Priority Data

Jul. 12, 2018  (EP) .................................... 18315014
Jul. 12, 2018  (EP) .................................... 18315015
Jul. 12, 2018  (EP) .................................... 18315016

(51) Int. Cl.
*H02H 7/22* (2006.01)
*H04B 3/54* (2006.01)
(Continued)

(52) U.S. Cl.
CPC .............. *H02H 7/22* (2013.01); *G06F 1/305* (2013.01); *G06F 1/3206* (2013.01);
(Continued)

(58) Field of Classification Search
CPC .......... H02H 7/22; H02H 1/00; H02H 1/0007; H04L 69/323; H04L 29/08; H04B 3/54;
(Continued)

(56) References Cited

U.S. PATENT DOCUMENTS 4,206,443 A   6/1980  Britton
5,177,657 A   1/1993  Baer et al.
(Continued)

FOREIGN PATENT DOCUMENTS

CN    101351803 A   1/2009
CN    101515722 A   8/2009
(Continued)

OTHER PUBLICATIONS

European Search Report with regard to the counterpart EP Patent Application 18315015.0 dated Jan. 4, 2019.
(Continued)

*Primary Examiner* — Danny Nguyen
(74) *Attorney, Agent, or Firm* — BCF LLP

(57) ABSTRACT

A method of limiting a total power delivered by a power distribution unit having a plurality of output connectors is disclosed. A configurable power threshold is assigned for each of the output connectors so that a sum of the configurable power thresholds of the output connectors does not exceed a maximum rated power for the power distribution unit. A power level of a given output connector is sensed. A delivery of power by the given output connector is stopped when the power level of the given output connector exceeds the configurable power threshold for the given output connector. Power delivery may be resumed in response to receiving a user command to rearm the given output connector. A power distribution unit adapted to limit its total power delivery is also disclosed.

15 Claims, 17 Drawing Sheets

(51) Int. Cl.
| | |
|---|---|
| *H02H 1/00* | (2006.01) |
| *H01H 47/00* | (2006.01) |
| *G06F 1/30* | (2006.01) |
| *G06F 1/3206* | (2019.01) |
| *H02J 3/02* | (2006.01) |
| *H02J 3/14* | (2006.01) |
| *H02J 3/18* | (2006.01) |
| *H04L 29/08* | (2006.01) |

(52) U.S. Cl.
CPC ........ *H01H 47/002* (2013.01); *H02H 1/0007* (2013.01); *H02J 3/02* (2013.01); *H02J 3/14* (2013.01); *H02J 3/1878* (2013.01); *H04B 3/54* (2013.01); *H04L 69/323* (2013.01)

(58) Field of Classification Search
CPC ...... H01R 13/713; H01R 25/00; H01R 27/02; H01R 25/006; H01R 13/6683; G05B 15/02; H02J 3/00; H02J 4/00
USPC .................................................. 361/78–79
See application file for complete search history.

(56) References Cited

U.S. PATENT DOCUMENTS

| | | | |
|---|---|---|---|
| 6,049,143 A * | 4/2000 | Simpson | H01R 13/7039 307/126 |
| 6,721,672 B2 | 4/2004 | Spitaels et al. | |
| 6,841,979 B2 | 1/2005 | Berson et al. | |
| 6,904,373 B2 | 6/2005 | Le et al. | |
| 7,196,433 B2 | 3/2007 | Yang | |
| 7,860,615 B2 | 12/2010 | Nelson et al. | |
| 7,917,792 B2 | 3/2011 | Brech et al. | |
| 8,212,395 B2 | 7/2012 | Jansma | |
| 8,305,737 B2 | 11/2012 | Ewing et al. | |
| 8,321,163 B2 | 11/2012 | Ewing et al. | |
| 8,368,379 B2 | 2/2013 | Gruetter et al. | |
| 8,374,729 B2 | 2/2013 | Chapel et al. | |
| 8,415,828 B2 | 4/2013 | Johnson et al. | |
| 8,421,475 B2 | 4/2013 | Thiim | |
| 8,494,661 B2 | 7/2013 | Ewing et al. | |
| 8,504,217 B2 | 8/2013 | Nilsen et al. | |
| 8,674,823 B1 | 3/2014 | Contario et al. | |
| 8,750,393 B1 | 6/2014 | Alshinnawi et al. | |
| 8,946,928 B2 | 2/2015 | Boe | |
| 8,947,258 B2 | 2/2015 | Pant et al. | |
| 9,043,002 B2 | 5/2015 | Longacre | |
| 9,143,007 B2 | 9/2015 | Wu et al. | |
| 9,379,773 B2 | 6/2016 | Vijayasankar et al. | |
| 9,400,726 B2 | 7/2016 | Nicholson et al. | |
| 9,430,010 B2 | 8/2016 | Palmer et al. | |
| 9,449,777 B2 | 9/2016 | Sievi-Korte et al. | |
| 9,461,709 B2 | 10/2016 | Griffith et al. | |
| 9,482,698 B2 | 11/2016 | Suchoff | |
| 9,513,141 B2 | 12/2016 | Kudo et al. | |
| 9,541,585 B2 | 1/2017 | Quittek et al. | |
| 9,583,936 B1 | 2/2017 | Wishman et al. | |
| 9,620,987 B2 | 4/2017 | Alexander et al. | |
| 9,660,519 B2 | 5/2017 | Maruyama | |
| 9,703,342 B2 | 7/2017 | Nicholson et al. | |
| 9,722,443 B2 | 8/2017 | Ishida et al. | |
| 9,817,457 B1 | 11/2017 | Pattikonda et al. | |
| 9,865,998 B1 | 1/2018 | Emert et al. | |
| 2008/0148075 A1 * | 6/2008 | Reder | G06F 1/26 713/300 |
| 2009/0189774 A1 | 7/2009 | Brundridge et al. | |
| 2011/0170223 A1 | 7/2011 | Dimarco et al. | |
| 2012/0200418 A1 | 8/2012 | Hirosaka | |
| 2013/0197895 A1 | 8/2013 | Wang et al. | |
| 2013/0241284 A1 * | 9/2013 | Santini | H02J 13/00002 307/31 |
| 2014/0218008 A1 | 8/2014 | Ewing et al. | |
| 2014/0361620 A1 | 12/2014 | Van et al. | |
| 2015/0212126 A1 | 7/2015 | Harding | |
| 2015/0341084 A1 | 11/2015 | Kim et al. | |
| 2016/0070282 A1 | 3/2016 | Chapel et al. | |
| 2016/0306397 A1 | 10/2016 | Chen et al. | |
| 2017/0125984 A1 * | 5/2017 | Mergener | H02J 13/0075 |
| 2017/0170449 A1 | 6/2017 | Alexander et al. | |
| 2017/0353015 A1 | 12/2017 | Stevens et al. | |
| 2018/0366885 A1 * | 12/2018 | Hewitt | G05B 15/02 |

FOREIGN PATENT DOCUMENTS

| | | |
|---|---|---|
| CN | 102891756 A | 1/2013 |
| CN | 103677196 A | 3/2014 |
| CN | 104428965 A | 3/2015 |
| CO | 107592952 A | 1/2018 |
| DE | 102010042609 A1 | 4/2012 |
| DE | 102012010512 A1 | 7/2013 |
| DE | 102013005439 A1 | 4/2014 |
| EP | 0576395 B1 | 3/1996 |
| EP | 2357711 A1 | 8/2011 |
| EP | 2910903 A1 | 8/2015 |
| EP | 2978090 A1 | 1/2016 |
| EP | 3244545 A1 | 11/2017 |
| FR | 1301944 A | 8/1962 |
| FR | 2867887 A1 | 9/2005 |
| FR | 3009768 B1 | 5/2017 |
| GB | 2486493 A | 6/2012 |
| JP | 2014193090 A | 10/2014 |
| KR | 20130098736 A | 9/2013 |
| WO | 2015148686 A1 | 10/2015 |

OTHER PUBLICATIONS

Pelley et al., "Power Routing: Dynamic Power Provisioning in the Data Center", ACM SIGPLAN Notices, 45(3), 2010, https://www.researchgate.net/publication/220938966_Power_Routing_Dynamic_Power_Provisioning_in_the_Data_Center, 13 pages.

"Geist Power", Power Monitoring with Geist Distribution Units, 2018, downloaded on Feb. 27, 2018 on http://www.geistglobal.com/products/power-distribution/monitored-pdus, 1 page.

English Translation of CN 103677196 retrieved on Sep. 27, 2018 and (on Espacenet) Oct. 16, 2019.

European Search Report with regard to the counterpart EP Patent Application 18315016.8 dated Oct. 18, 2018.

European Search Report with regard to the counterpart EP Patent Application 18315014.3 dated Nov. 26, 2018.

Papadopoulos, "Application of Narrowband Power-Line Communication in Medium-Voltage Smart Distribution Grids", http://ieeexplore.ieee.org/abstract/document/6479715/, IEEE Transactions on Power Delivery, 2013, vol. 28, No. 2, pp. 981-988.

Milioudis, "High impedance fault evaluation using narrowband Power Line Communication techniques", 2011, https://ieeexplore.ieee.org/abstract/document/6019231, pp. 1-6.

Doshi, "Real Time Fault Failure Detection in Power Distribution Line using Power Line Communication", Ilnternational Journal of Engineering Science and Computing, 2016, vol. 6, Issue 5, http://ijesc.org/, pp. 4834-4837.

"APC", Switched Rack PDU, Feb. 27, 2018, downloaded on Feb. 27, 2018 on http://www.apc.com/shop/us/en/categories/power-distribution/rack-power-distribution/switched-rack-pdu/_/N-17k76am, 3 pages.

ACS723, "High Accuracy, Galvanically Isolated Current Sensor IC With Small Footprint SOIC8 Package", downloaded on Mar. 3, 2018 on https://www.allegromicro.com/en/Products/Sense/current-sensor-ics/Zero-To-Fifty-Amp-Integrated-Conductor-Sensor-ICs/ACS723.aspx, 22 pages.

English Abstract for EP2978090 retrieved on Espacenet on Jul. 6, 2019.

English Abstract for DE102013005439 retrieved on Espacenet on Jul. 6, 2019.

English Abstract for 102010042609 retrieved on Espacenet on Jul. 6, 2019.

English Abstract for FR3009768 retrieved on Espacenet on Jul. 6, 2019.

(56) References Cited

OTHER PUBLICATIONS

English Abstract for DE102012010512 retrieved on Espacenet on Jul. 6, 2019.
English Description and Claims for FR1301944 retrieved on Espacenet on Jul. 6, 2019.
English Abstract for EP0576395 retrieved on Espacenet on Jul. 6, 2019.
English Abstract for JP2014193090 retrieved on Espacenet on Jul. 6, 2019.
English Abstract for KR20130098736 retrieved on Espacenet on Jul. 6, 2019.
English Abstract for CN102891756 retrieved on Espacenet on Jul. 6, 2019.
English Abstract for EP2910903 retrieved on Espacenet on Jul. 7, 2019.
English Abstract for FR2867887 retrieved on Espacenet on Jul. 6, 2019.
Office Action with regard to the counterpart CN Patent Application No. 201910624459.1 dated Aug. 11, 2021, and English Translation.
English Abstract for CN101351803 retrieved on Espacenet dated Sep. 14, 2021.
English Abstract for CN101515722 retrieved on Espacenet dated Sep. 14, 2021.
English Abstract for CN107592952 retrieved on Espacenet dated Sep. 14, 2021.
English Abstract for CN104428965 retrieved on Espacenet dated Sep. 14, 2021.

\* cited by examiner

METHOD AND POWER DISTRIBUTION UNIT FOR LIMITING A TOTAL DELIVERED POWER

CROSS-REFERENCE

The present application claims priority from European Patent Applications no 18315015.0, no 18315016.8, and no 18315014.3, all of which were filed on Jul. 12, 2018, the disclosures of which are incorporated by reference herein in their entirety.

FIELD

The present technology relates to electronic power supplies. In particular, a method for limiting a total power delivered by a power distribution unit and a power distribution unit implementing the method are disclosed.

BACKGROUND

Large-scale networks used for cloud computing, search engines, and similar applications, typically include tens or hundreds of servers for load sharing and for redundancy. These networks need to be highly scalable, so there is a need to frequently add more servers to the network infrastructure.

Large-scale server networks consume very large amounts of electric power and generate a lot of heat. Any manner of reducing power consumption is desirable.

Many servers in large-scale server networks required AC power. Fuses and/or relays may be used to cut delivery of AC power to a server in case of a fault, for example in the occurrence of a short-circuit. However fuses are typically slow to react and must be replaced after a short-circuit. Relays may protect a server from a short-circuit, and may be rearmed, but are very slow to react. Additionally, AC current that is provided to a server must flow through contacts of a relay, causing important power losses. Measurements have shown that, typically up to 4% of the power delivered to a server may be lost in a relay. The energy wasted in the relay causes heat accumulation in the power supply that, for a large server bank, translates into important cooling needs.

Eventual loss of a server in a large-scale server network can be compensated when sufficient redundancy is provided in the network. The loss of one power distribution unit (PDU) may however have significant impact when it causes the concurrent loss of a plurality of servers connected thereto.

Availability requirements for large-scale server networks are extremely high, so maintenance activities, including connection of additional servers and replacement of failed units must be done without delay and without service disruption.

Even though the recent developments identified above may provide benefits, improvements are still desirable.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches.

SUMMARY

Embodiments of the present technology have been developed based on developers' appreciation of shortcomings associated with the prior art.

In particular, such shortcomings may comprise (1) slow reaction times of conventional fuses and relays used to protect circuits; (2) power losses in relays; and/or (3) concurrent loss of a plurality of loads, such as servers, connected to a same power distribution unit.

In one aspect, various implementations of the present technology provide a method of limiting a total power delivered by a power distribution unit (PDU) having a plurality of output connectors, comprising:
- assigning a configurable power threshold for each of the plurality of output connectors so that a sum of the configurable power thresholds of the plurality of output connectors does not exceed a maximum rated power for the PDU;
- sensing a power level of a given one of the plurality of output connectors; and stopping a delivery of power by the given one of the plurality of output connectors when the power level of the given one of the plurality of output connectors exceeds the configurable power threshold for the given one of the plurality output connectors.

In some implementations of the present technology, sensing the power level of the given one of the plurality of output connectors comprises: sensing a power parameter selected from a voltage, a current, an effective current, an instantaneous power, an instantaneous active power, an instantaneous reactive power, a phase angle of the voltage relative to the current, and a combination thereof; and calculating the power level of the given one of the plurality of output connectors based on the sensed power parameter.

In some implementations of the present technology, the method further comprises providing a first visual indication in proximity to the given one of the plurality of output connectors when stopping the delivery of power by the given one of the plurality of output connectors.

In some implementations of the present technology, the method further comprises providing a second visual indication in proximity to one of the plurality of output connectors having a configurable power threshold of zero.

In some implementations of the present technology, different configurable power thresholds are assigned to at least a subset of the plurality of output connectors.

In some implementations of the present technology, assigning the configurable power threshold for each of the plurality of output connectors comprises configuring a current limit for each of the plurality of output connectors.

In some implementations of the present technology, the method further comprises transmitting from the PDU, over a power line, an indication of the power level of the given one of the plurality of output connectors.

In some implementations of the present technology, the indication of the power level of the given one of the plurality of output connectors is transmitted over the power line using a power line communication (PLC) protocol.

In some implementations of the present technology, the method further comprises: receiving a user command to rearm the given one of the plurality of output connectors; and resuming the delivery of power by the given one of the plurality of output connectors in response to the user command.

In other aspects, various implementations of the present technology provide a power distribution unit (PDU), comprising:
- an input connector;
- a plurality of output connectors;
- a plurality of circuits, each circuit being adapted to selectively connect the input connector to a corresponding one of the plurality of output connectors, each circuit comprising a sensor adapted to sense a power level of the corresponding one of the plurality of output connectors; and a controller operatively connected to the plurality of circuits, the controller being adapted to:
assign a configurable power threshold to each of the plurality of output connectors so that a sum of the configurable power thresholds assigned to the plurality of output connectors does not exceed a maximum rated power for the PDU; and
cause a disconnection of a given one of the plurality of output connectors from the input connector by a corresponding one of the plurality of circuits when the power level of the given one of the plurality of output connectors exceeds the configurable power threshold for the given one of the plurality output connectors.

In some implementations of the present technology, the sensor of each of the plurality of circuits is selected from a voltmeter, an ammeter, a power meter and a combination thereof; and the controller is further adapted to calculate a power level of each of the output connector based on a power parameter provided by the sensor.

In some implementations of the present technology, each of the plurality of circuits comprises a relay, the controller causing the relay of the corresponding one of the plurality of circuits to disconnect the given one of the plurality of output connectors from the input connector.

In some implementations of the present technology, each of the plurality of circuits comprises a detector operatively connected to a respective sensor, each detector being further adapted to detect when a respective power level exceeds a fixed power limit and to cause the relay of a respective circuit to disconnect a respective one of the plurality of output connectors from the input connector.

In some implementations of the present technology, the detector of each of the plurality of circuits enforces a same fixed power limit greater than any one of the configurable power thresholds.

In some implementations of the present technology, the PDU further comprises a power line communication (PLC) protocol modem operatively connected to the controller and adapted to transmit an indication of the power level of at least one of the output connectors over a power line connected to the input connector.

In some implementations of the present technology, the PDU further comprises a user interface operatively connected to the controller, the controller being further adapted to: receive a user command from the user interface; and cause the plurality of circuits to reconnect the given one of the plurality of output connectors to the input connector in when receiving a user command from the user interface.

In the context of the present specification, unless expressly provided otherwise, a computer system may refer, but is not limited to, an "electronic device", an "operation system", a "system", a "computer-based system", a "controller unit", a "monitoring device", a "control device" and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (CD-ROMs, DVDs, floppy disks, hard disk drives, etc.), USB keys, flash memory cards, solid-state drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first", "second", "third", etc. have been used as adjectives only for the purpose of allowing for distinction between the nouns that they modify from one another, and not for the purpose of describing any particular relationship between those nouns.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

Figure 1:
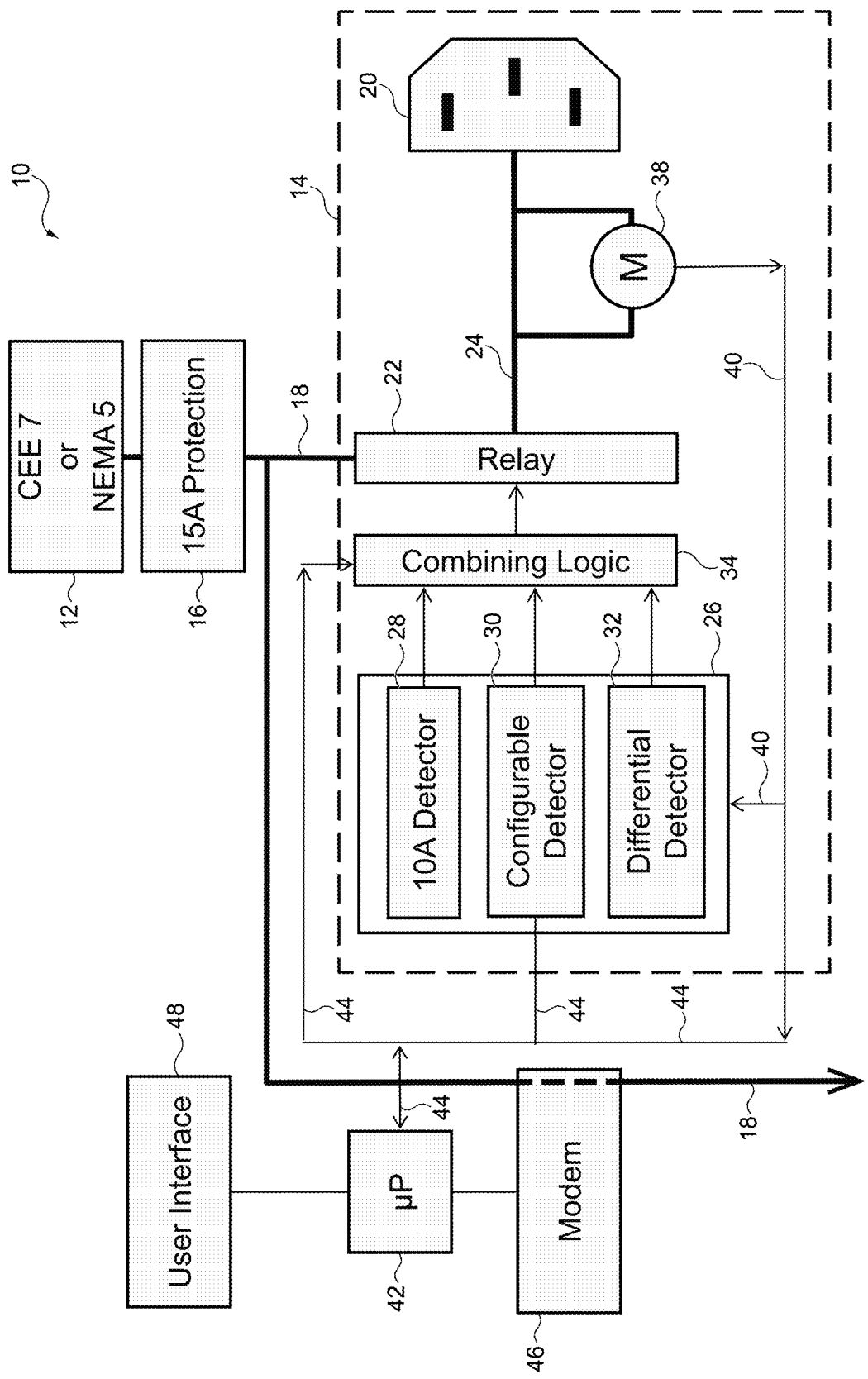
FIG. 1 is a high level schematic diagram of an AC smart fuse in accordance with an embodiment of the present technology.

It should also be noted that, unless otherwise explicitly specified herein, the drawings are not to scale.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements that, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor", may be provided by use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general-purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that module may include for example, but without being limitative, computer program logic, computer program instructions, software, stack, firmware, hardware circuitry or a combination thereof which provides the required capabilities.

With these fundamentals in place, we will now consider some non-limiting examples to illustrate various implementations of aspects of the present technology.

Various aspects of the present disclosure generally address one or more of the problems found in conventional power supplies for large-scale server networks. To this end, the present disclosure, amongst other aspects, introduces a circuit that provides AC power to a load, this circuit being adapted for integration with other similar circuits into a power distribution unit (PDU).

In an embodiment, the circuit comprises an output connector adapted for connecting the circuit to a load and a relay connecting the output connector to a source of AC power. The relay is responsive to a disabling signal to disconnect the output connector from the source of AC power. A sensor senses a level of power delivered to the load via the output connector. The power level may for example be based on a measurement of a current delivered to the load via the output connector. A detector receives a sensed power level from the sensor and emits a first fault signal when the power level is found to be excessive. A latch maintains the first fault signal until it receives a rearm signal. A controller receives the sensed power level from the sensor and emits a second fault signal when the sensed power level exceeds a configurable power threshold. The controller ceases the emission of the second fault signal and emits the rearm signal to cause the latch to release the first fault signal when receiving a user command A logic combiner generates the disabling signal when it receives at least one of the first and second fault signals. The circuit of this embodiment is thus an "AC smart fuse" that is turned off to cut power delivery to the load in case of a fault. The AC smart fuse may react to a fault determined in view of either of a fixed power limit or a configurable power threshold, which may, for example, be defined in terms of a fixed current limit or a configurable current threshold. The AC smart fuse also allows controlling a level of power or current into the load in normal operation.

FIG. 1 is a high-level schematic diagram of an AC smart fuse in accordance with an embodiment of the present technology. Without limitation, the AC smart fuse may be integrated in a power distribution unit (PDU) 10. In the illustrated embodiment, the PDU 10 includes an input connector 12, for example a CEE 7-type plug for use in European countries or a National Electrical Manufacturers Association (NEMA) 5-type plug for use in North American countries, and one or more channel, each channel being adapted for powering a load (not shown). The input connector 12 is adapted for connecting the PDU 10 to a source of AC power (not shown), also called a sector or a grid. The PDU 10 is protected against overcurrent by a fixed protection 16, for example a 15-ampere circuit breaker. Each channel comprises an output circuit 14. A power line 18 connects the input connector 12 to each of the output circuits 14. Each of the output circuits 14 comprises an output connector 20 adapted for connecting the output circuit 14 to the load, for example a C13-type plug, connected in series to the input connector 12 via the power line 18, a relay 22, and an internal power line 24. The relay 22 selectively connects the output connector 22 to the source of AC power via the input connector 12. Each output circuit 14 comprises a detection sub-circuit 26 that protects the output connector 20 by controlling the relay 22. The detection sub-circuit 26 includes a fixed detector 28 adapted to apply a fixed power limit of the output circuit 14 and a configurable detector 30 adapted to apply a configurable power threshold of the output circuit 14. The fixed power limit is greater than a maximum value for the configurable power threshold. The fixed detector 28 emits a first fault signal when the sensed power level exceeds the fixed power limit and the configurable detector 30 emits a second fault signal when the sensed power level exceeds the configurable power threshold.

In an embodiment, the fixed detector 28 is adapted to enforce a fixed high-level current limit, for example 10 amperes, and the configurable detector 30 is adapted to enforce a definable current set point. In the same or another embodiment, a differential detector 32 compares a load current flowing from the output connector 20 to the load and a neutral current returning to the output connector 20 from the load in order to detect any ground fault at the load. The differential detector 32 emits a third fault signal when a difference between load current flowing from the output connector 20 to the load and a neutral current returning to the output connector 20 from the load exceeds a maximum differential current set-point.

Any one of the fixed detector 28, the configurable detector 30 and the differential detector 32 may thus issue a fault signal to cause a combining logic 34 to generate a disabling signal 36. The disabling signal 36, in turn, causes the relay 22 to adopt a non-conducting position, causing the output connector 20 and the load to become disconnected from the input connector 12 and thus from the source of AC power. The combining logic 34 maintains the disabling signal 36, once set, until it receives a rearm signal.

In the output circuit 14, a sensor 38 senses a level of power delivered to the load via the output connector 20. In an embodiment, the sensor 38 measures the load current flowing from the output connector 20 toward the load and the neutral current returning from the load to the output connector 20. Use of other types of sensors, for example a voltmeter, an ammeter, a power meter and a combination thereof, is also contemplated. The sensor 38 provides measured power or current values 40 to the detection sub-circuit 26.

As illustrated, current flows from the input connector 12 and the fixed protection 16 via the power line 18 through the relay 22 before its measurement by the sensor 38. However, in at least one embodiment as illustrated in later Figures, the current may flow through the sensor 38 before reaching the relay 22. FIG. 1 is therefore highly schematic and is intended to provide a conceptual view of some aspects of the present technology.

The PDU 10 also comprises a controller 42, for example a microprocessor (μP), operatively connected to the detection sub-circuit 26, to the combining logic 34 and to the sensor 38 of each output circuit 14 via an internal bus 44. The controller 42 receives the measured power values or the measured current values 40 from the sensor 38 via the internal bus 44. The controller 42 provides signals, also via the internal bus 44, to define the set point of the configurable detector 30 of the detection sub-circuit 26. The controller 42 may also send a rearm signal allowing the combining logic 34 to release the disabling signal 36.

A modem 46 allows the controller 42 to communicate with other devices, for example to a remote controller (not shown) or to controllers of other PDUs, via the power line 18, using for example a power line communication (PLC) protocol. A user interface 48 allows a user of the PDU 10 to communicate with the controller 42. The user interface 48 is not necessarily part of the PDU 10 but may be connected thereto via a communication link.

In an embodiment, the PDU 10 includes one (1) input connector 12, one controller 42, and eight (8) distinct output circuits 14, each of which includes its own output connector 20, detection sub-circuit 26, combining logic 34 and sensor 38. In the same or another embodiment, the input connector 12 with the fixed protection 16 can deliver up to 15 amperes to the output circuits 14. The controller 42 may control each distinct configurable detector 30 so that a collective load current delivered by all output circuits 14 of the PDU 10 does not exceed a maximum limit, for example the 15-ampere limit of the fixed protection 16.

Figure 2:
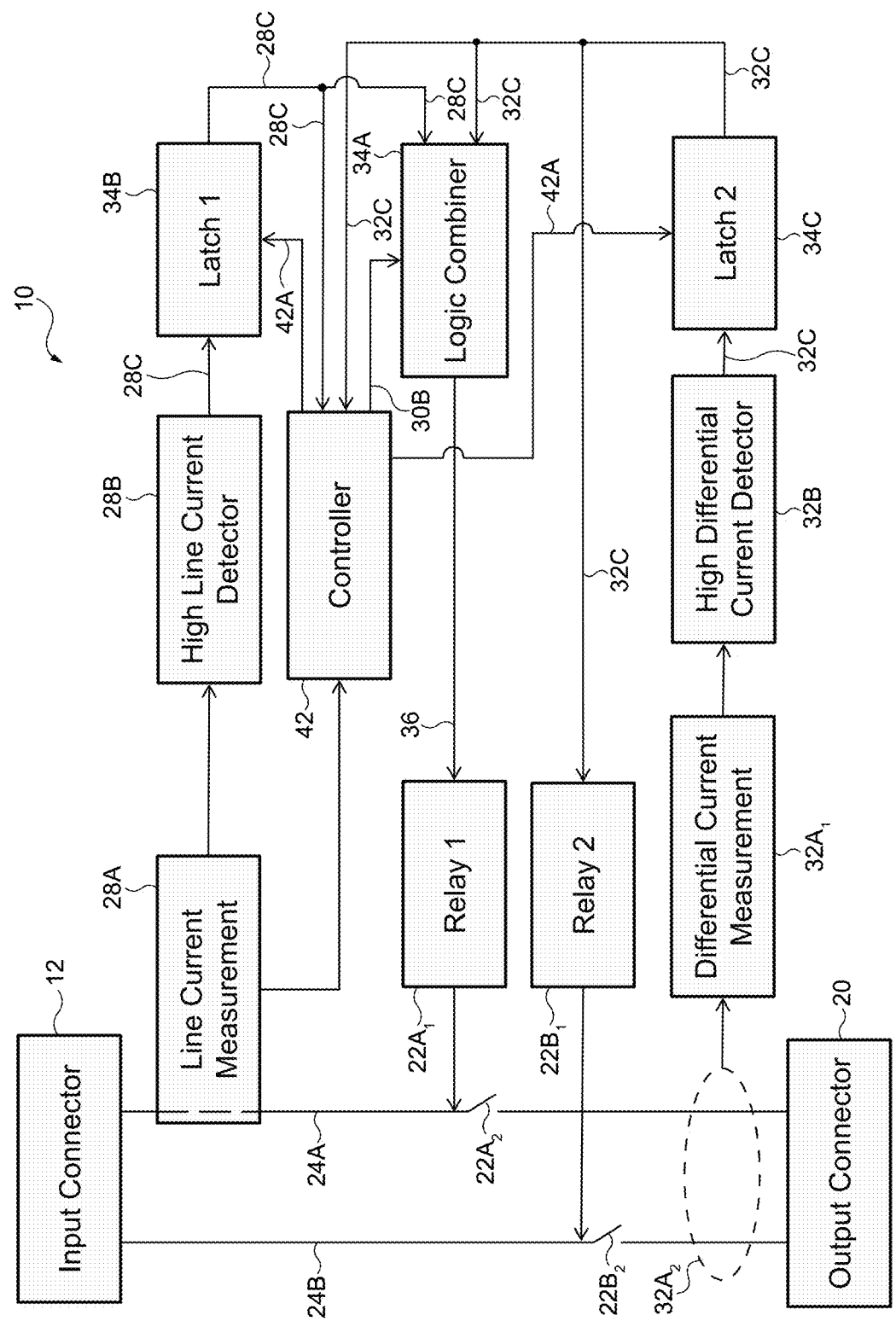
FIG. 2 is another high level schematic diagram of the AC smart fuse in accordance with an embodiment of the present technology.

FIG. 2 is another high-level schematic diagram of the AC smart fuse in accordance with an embodiment of the present technology. FIG. 2 provides an alternate representation of the PDU 10 introduced in the foregoing description of FIG. 1. Although a single instance of the circuit 14 is represented on FIG. 2, the PDU 10 may include a larger number of instances of the circuit 14.

The fixed detector 28 comprises a sensor 28A of a line current and a high line current detector 28B. The sensor 28A is one possible implementation of the sensor 38 of FIG. 1 that, in this particular implementation, senses the line current to provide an indication of the power delivered to the load via the output connector 20.

The configurable detector 30 is implemented, in this embodiment, as a software function in the controller 42 that uses, as an input, a measurement of the line current received from the sensor 28A.

The differential detector 32 comprises a sensor $32A_1$ that uses a current transformer $32A_2$ to detect a difference between a current flowing toward the load via the output connector 20 and a current returning from the load. The differential detector 32 also includes a high differential current detector 32B.

The combining logic 34 comprises a logic combiner 34A, a first latch 34B that receives and maintains a fault signal 28C from the high line current detector 28B and a second latch 34C that receives and maintains a fault signal 32C from the high differential current detector 32B.

The relay 22 comprises a first relay $22A_1$ having a contactor $22A_2$ adapted to selectively stop conduction on a live lead 24A of the internal power line 24, and a second relay 22B$_1$ having a contactor 22B$_2$ adapted to selectively stop conduction on a neutral lead 24B of the internal power line 24.

When the high line current detector 28B determines that a fixed, high current limit is exceeded, it sends the fault signal 28C to the first latch 34B. The first latch 34B becomes set. The first latch 34B maintains and forwards the fault signal 28C to the logic combiner 34A and to the controller 42 until a rearm signal 42A is received from the controller 42.

When the controller 42 determines that a configurable current limit is exceeded, it sends a fault signal 30B to the logic combiner 34A. The controller 42 internally determines when to remove the fault signal 30B.

When the high differential current detector 32B determines that the maximum differential current set-point is exceeded, it sends the fault signal 32C to the second latch 34C. The second latch 34C becomes set. The second latch 34C maintains and forwards the fault signal 32C to the logic combiner 34A and to the controller 42 until a rearm signal 42A is received from the controller 42.

When any of the fault signals 28C, 30B, 32C, or a combination of these signals, is applied to the logic combiner 34A, the logic combiner 34A sends a disabling signal to the first relay 22A$_1$. The first relay 22A$_1$ in turn causes an opening of the contactor 22A$_2$ and power delivery to the load connected to the output connector 20 is interrupted.

In case of a ground fault, the fault signal 32C is also applied to the second relay 22B$_1$. The second relay 22B$_1$ in turn causes an opening of the contactor 22B$_2$.

The controller 42 may send to the user interface 48 information about operational conditions of the PDU 10 and of each of its output circuits 14. In particular, when a fault has been detected in a given output circuit 14, following which power delivery to the load connected to the output connector 20 of that output circuit 14 has been interrupted, the user may consult information related to the type of detected fault. After having taken care of the root cause of the fault, the user may enter, via the user interface 48, a command for putting the given output circuit 14 back into service. The controller 42 receives this command and issues the rearm signal 42A applied to the first and second latches 34B and 34C of the given output circuit 14. If the controller 42 has previously set the fault signal 30B due to the configurable current limit having been exceeded for the given output circuit, the controller 42 also terminates the fault signal 30B at that time.

A particular embodiment of the output circuit 14 integrated in the PDU 10 will now be described with reference to FIGS. 3-9, each of which show example details of some components of the PDU 10.

Figure 3:
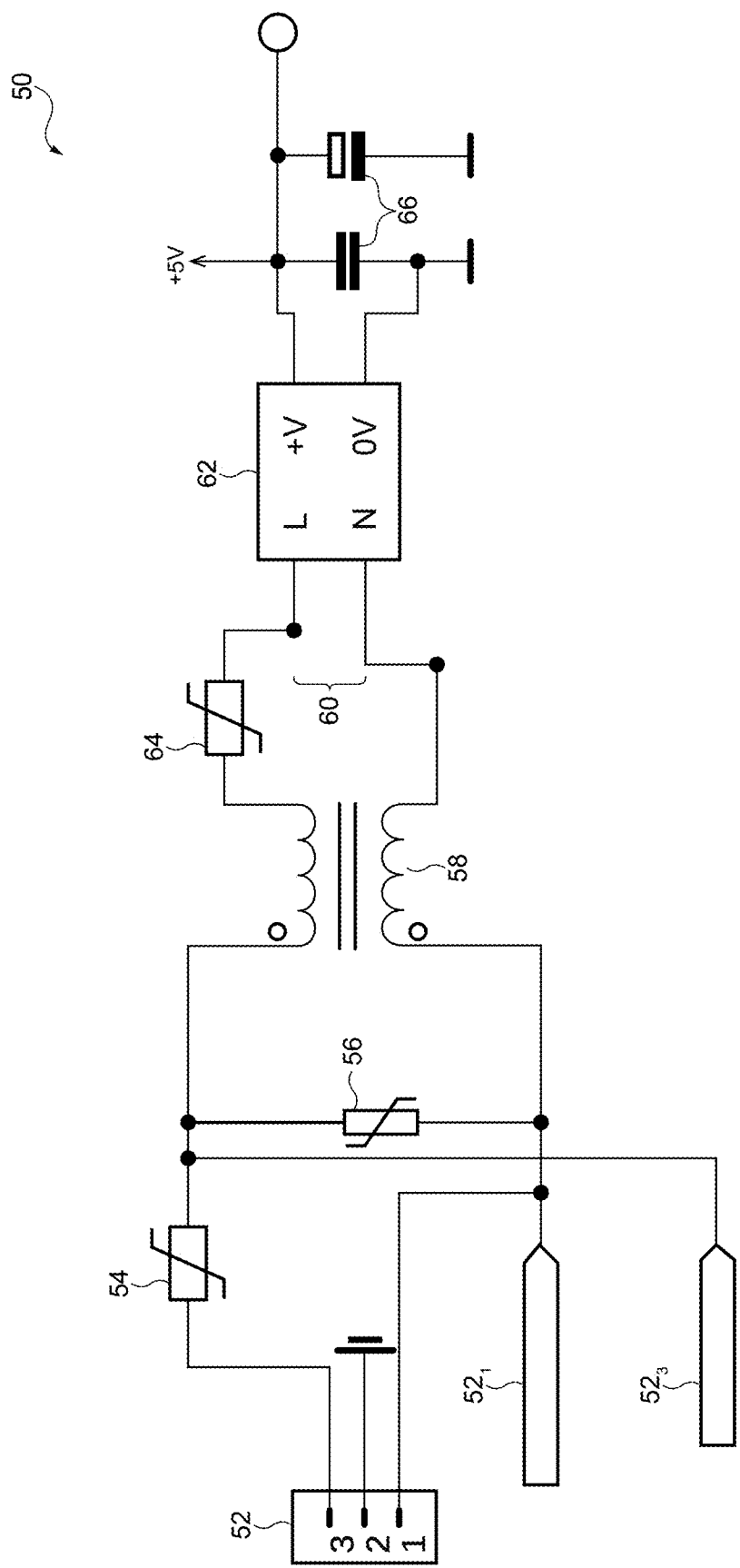
FIG. 3 is a diagram of an AC to DC converter for the power distribution unit in accordance with an embodiment of the present technology.

FIG. 3 is a diagram of an AC to DC converter 50 for the PDU 10 in accordance with an embodiment of the present technology. The AC to DC converter 50 includes an input connector 52 connected to the power line 18 of FIG. 1, downstream of the fixed protection 16, and having three (3) pins 52$_1$, 52$_2$ and 52$_3$. Pin 52$_1$ has a neutral voltage, pin 52$_2$ is connected to ground (GND) and pin 52$_3$ is a live pin having an AC voltage of the sector as applied to the input connector 12 of FIG. 1. In an embodiment, the relay 22 of FIG. 1 is directly connected to pin 52$_1$ and is connected to pin 52$_3$ via a fuse 54. A varistor 56 protects the AC to DC converter 50 from eventual overvoltage at the input connector 52. A transformer 58 provides a low AC voltage 60 to an AC/DC converter 62, for example a VTX-214-001-105 from Vigortronix™, via a fuse 64. The low AC voltage 60 is proportional to, and representative of, the voltage of the source of AC power. The AC/DC converter 62 provides a +5 VDC tension for use by various components of the PDU 10. Capacitors 66 stabilize the +5 VDC tension.

Figure 4:
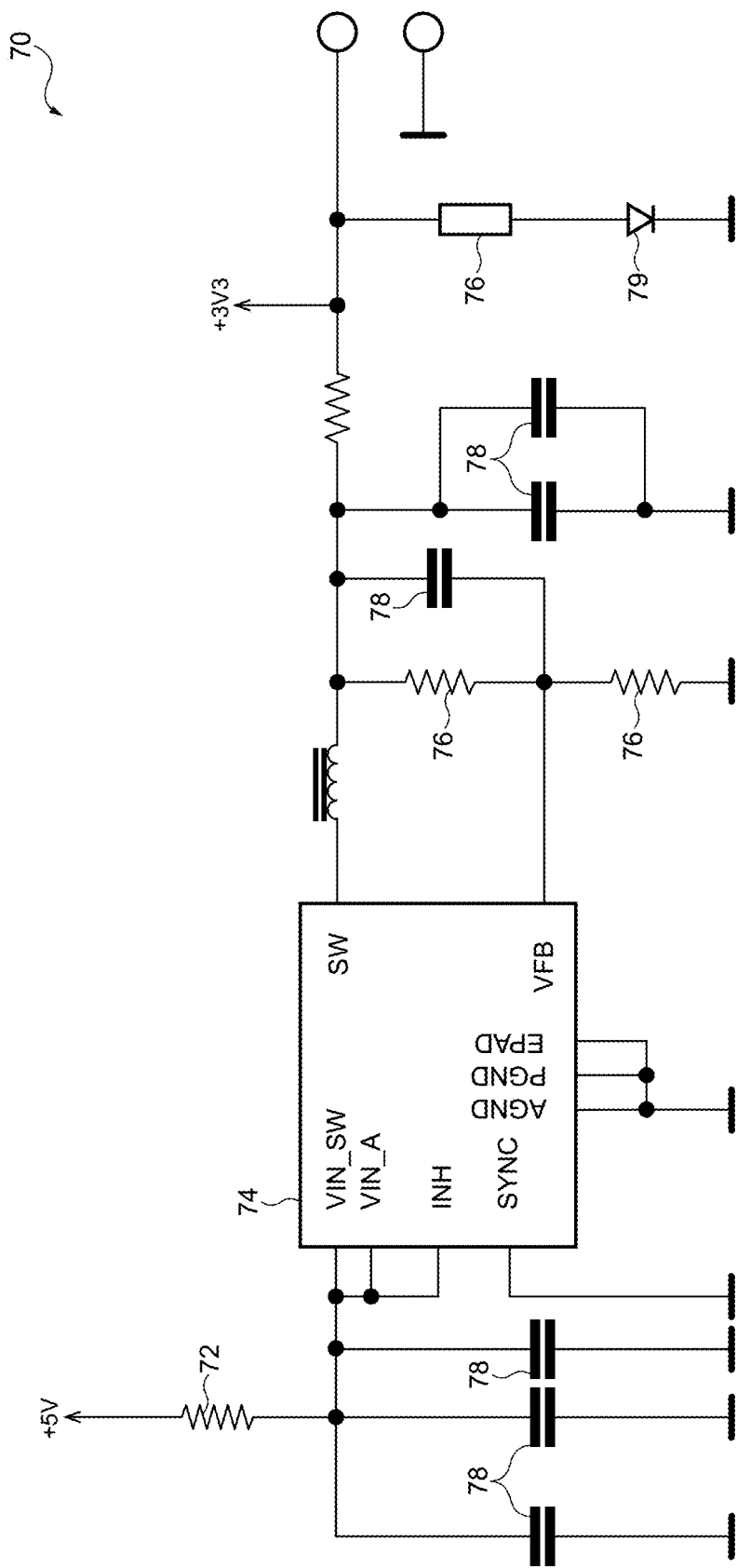
FIG. 4 is a diagram of a step-down converter in accordance with an embodiment of the present technology.

FIG. 4 is a diagram of a step-down converter 70 in accordance with an embodiment of the present technology. The +5 VDC tension from the AC/DC converter 62 of FIG. 2 is applied, via a resistor 72, to a step-down regulator 74, for example a STS10PUR from STMicroelectronics™, that provides a +3.3 VDC tension. Various resistances 76 and capacitors 78 are used to stabilize the +3.3 VDC tension. A light emitting diode (LED) 79 provides a visual indication of the availability of the +3.3 VDC tension.

Figure 5:
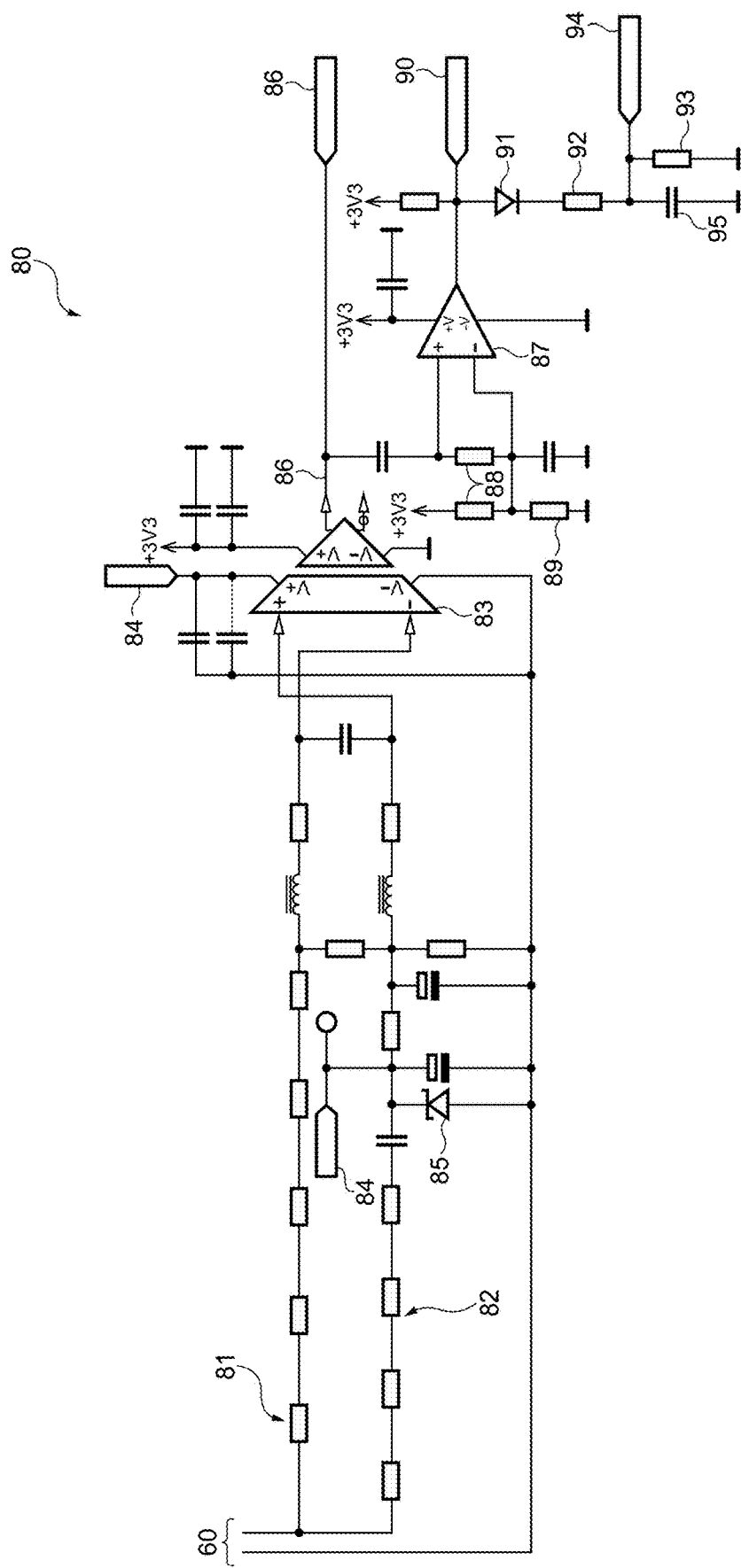
FIG. 5 is a diagram of a zero crossing detector in accordance with an embodiment of the present technology.

FIG. 5 is a diagram of a zero crossing detector 80 in accordance with an embodiment of the present technology. The low AC voltage 60 present at the input of the AC/DC converter 62 of FIG. 3 is also applied via two (2) parallel series of resistors 81, 82 to inputs of an amplifier 83, for example an isolated differential amplifier. A voltage sampled at point 84 of the series of resistors 82, at the level of a Zener diode 85, has characteristics of a DC voltage and is applied as a voltage source of an input side of the amplifier 83. An output side of the amplifier 83 is powered by the +3.3 VDC tension from the step-down converter 70. An output 86 of the amplifier 83 is proportional to the voltage of the source of AC power. This output 86 is applied to an amplifier 87 that is biased by resistors 88 and 89 to provide an output 90 that alternates between positive and negative values and thus detects voltage transitions of the source of AC power. The same output 90 passes through a diode 91 and through a voltage divider having resistors 92 and 93 to provide a sector presence indication 94, which is filtered by a capacitor 95.

Figure 6:
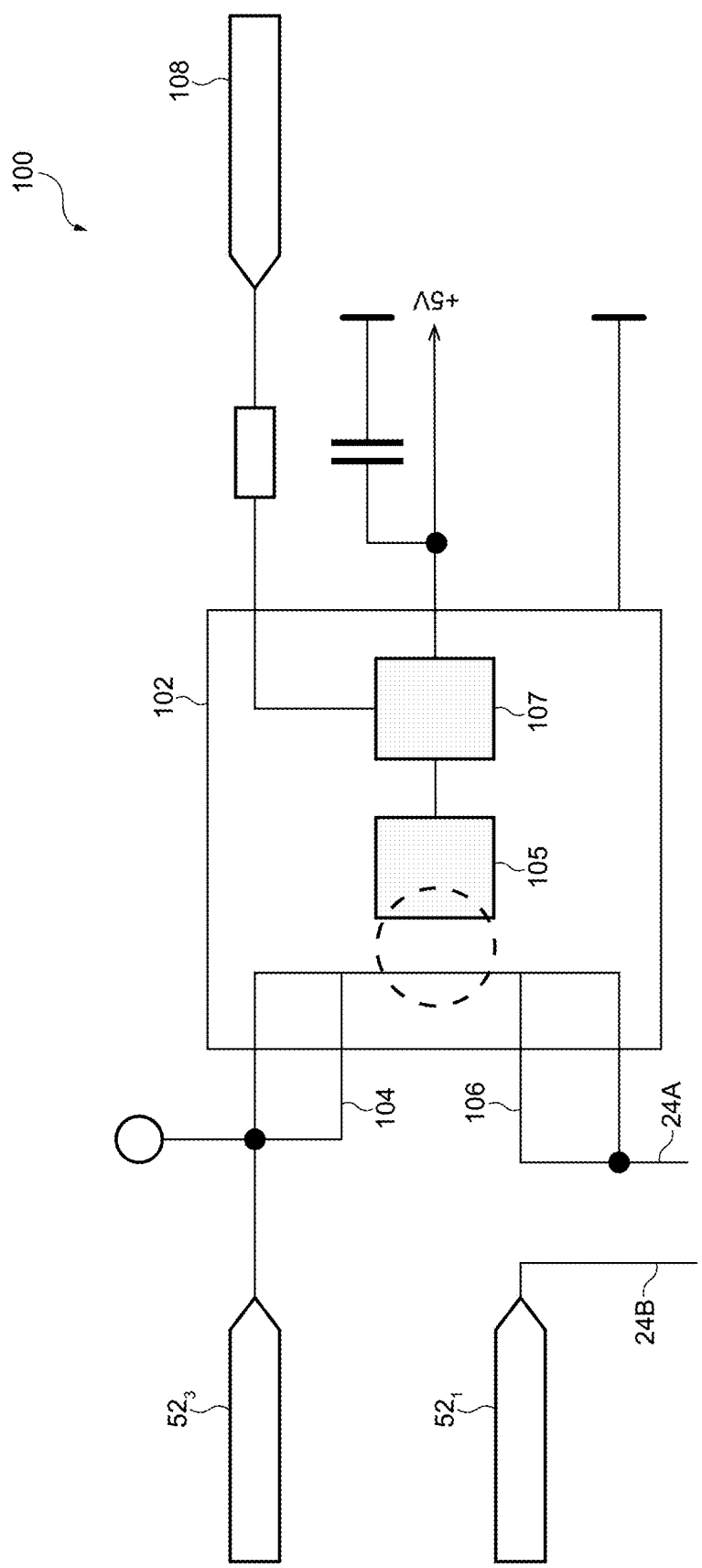
FIG. 6 is a diagram of a current measurement circuit in accordance with an embodiment of the present technology.

FIG. 6 is a diagram of a current measurement circuit 100 in accordance with an embodiment of the present technology. The measurement circuit 100 is an example implementation of the sensor 38 of FIG. 1 and of the sensor 28A of FIG. 2. In an embodiment, the circuit 100 is connected to pins 52$_1$ and 52$_3$ of the input connector 52 of FIG. 3, between the input connector 52 and the relay 22 of FIG. 1. Current from the sector flows through pin 52$_1$ into a current sensor 102, for example an ACS723 from Allegro™ MicroSystems, LLC, via an input 104 and flows out from the current sensor 104 via an output 106 on the live lead 24A. An output 108 of the current sensor 102 provides a voltage that is proportional to the current flowing through the current sensor 102.

The current sensor 102 is powered by the +5 VDC tension from the AC/DC converter 62. An internal impedance of the current sensor 102 is very low, being for example less than one (1) milliohm, so there is no noticeable voltage drop or power wasted as the current flows through current sensor 102. The current sensor 102 may use a Hall effect detector 105 isolating an internal generator 107 of the output 108 from the current flowing from the source of AC power toward the load via the pin 52$_1$.

Figure 7:
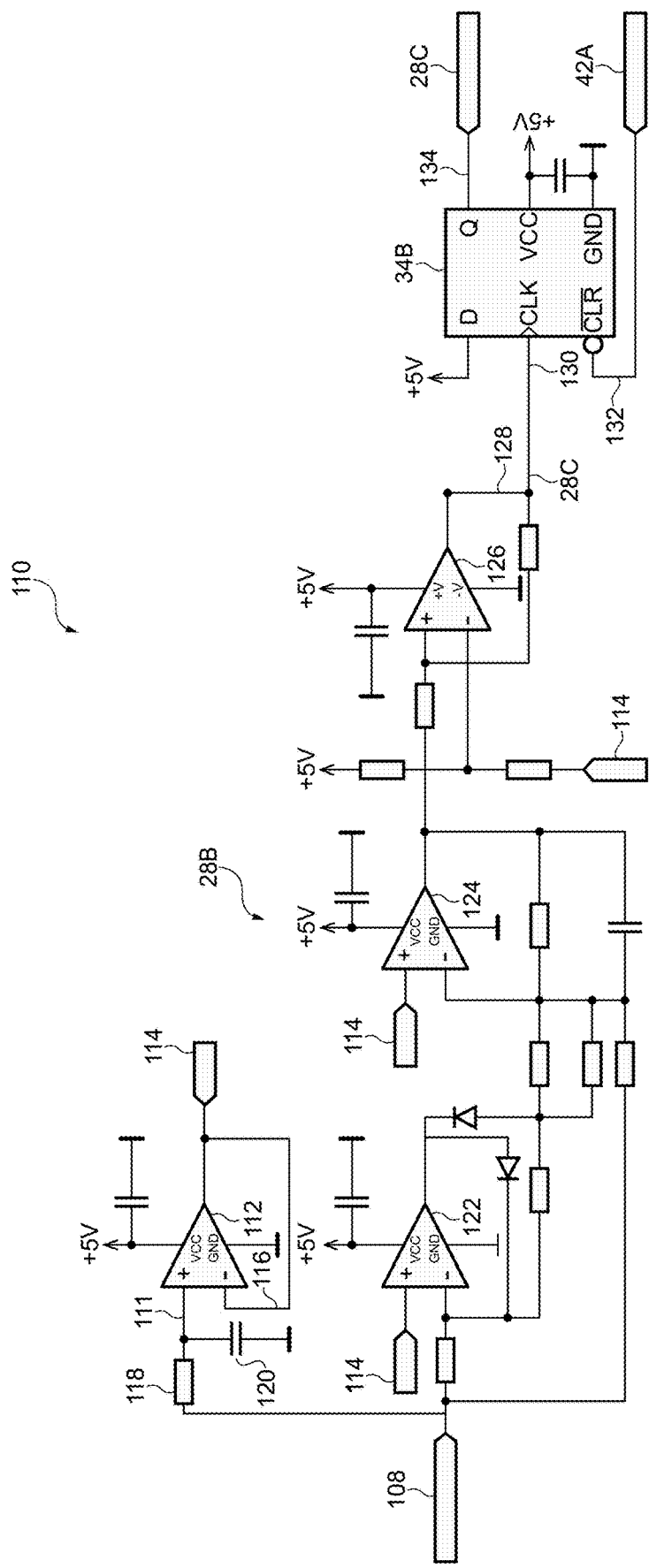
FIG. 7 is a diagram of a fixed high line current detection circuit in accordance with an embodiment of the present technology.

FIG. 7 is a diagram of a fixed high line current detection circuit 110 in accordance with an embodiment of the present technology. The output 108 of the current sensor 102 oscillates about a +2.5 VDC tension. It is applied to an input 111 of an amplifier 112 having an output 114 directly connected to another input 116. The amplifier 112 has a unity gain. A resistor 118 and a capacitor 120 filter variations of the output 108 so that the output 114 becomes a reference voltage having a stable +2.5 VDC tension. This reference voltage 114 is applied to a cascade of amplifiers 122, 124 and 126 of the high line current detector 28B.

The output 108 of the current sensor 102 is also applied to the cascade of amplifiers 122, 124 and 126 that detect when the current flowing through the current sensor 102 exceeds the fixed high-level current limit, for example 10 amperes. In that occurrence, an output 128 of the amplifier 126 becomes the fault signal 28C applied to the latch 34B. The latch 34B, for example an SN74LVC1G175 flip-flop device from Texas Instruments™, is powered by the +5 VDC tension. It has a clock input 130 that is connected to the output 128 of the amplifier 126 to receive the fault signal 28C when set. The latch 34B also has a clear input 132 on which the controller 42 may apply the rearm signal 42A. Application of fault signal 28C on the clock input 130 causes an output 134 of the latch 34B to forward the fault signal 28C to the logic combiner 34A and to the controller 42 as shown on FIG. 2. Once the fault signal 28C is set at the output 134, it remains set in case of removal of the fault signal 28C at the clock input 130 until the rearm signal 42A is applied by the controller 42 on the clear input 132.

Figure 8:
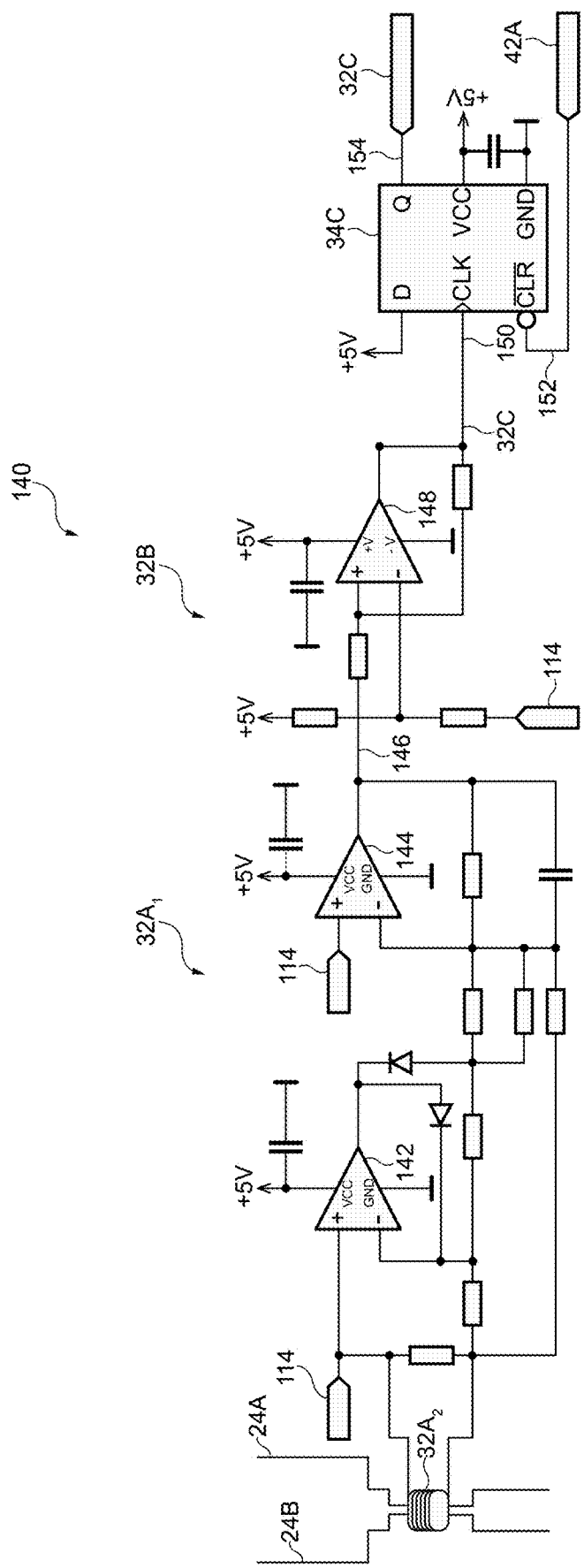
FIG. 8 is a diagram of a high differential current detection circuit in accordance with an embodiment of the present technology.

FIG. 8 is a diagram of a high differential current detection circuit 140 in accordance with an embodiment of the present technology. The current transformer $32A_2$ senses a difference between currents flowing through the live lead 24A and the neutral lead 24B of the internal power line 24 leading to the output connector 20. This measurement is applied to the sensor $32A_1$, more precisely to a cascade formed of amplifiers 142 and 144. An output 146 of the amplifier 144 is an image of the differential current applied to an amplifier 148 of the high differential current detector 32B. The amplifier 148 issues the fault signal 32C when the measured differential current exceeds the maximum differential current set-point. The fault signal 32C is applied to the latch 34C. The latch 34C is similar to the latch 34B and is also powered by the +5 VDC tension. It has a clock input 150 that is connected to the amplifier 148 to receive the fault signal 32C when set. The latch 34C also has a clear input 152 on which the controller 42 may apply the rearm signal 42A. Application of fault signal 32C on the clock input 150 causes an output 154 of the latch 34C to forward the fault signal 32C to the logic combiner 34A, to the relay $22B_1$ and to the controller 42 as shown on FIG. 2. Once the fault signal 32C is set at the output 154, it remains set in case of removal of the fault signal 32C at the clock input 150 until the rearm signal 42A is applied by the controller 42 on the clear input 152.

Figure 9:
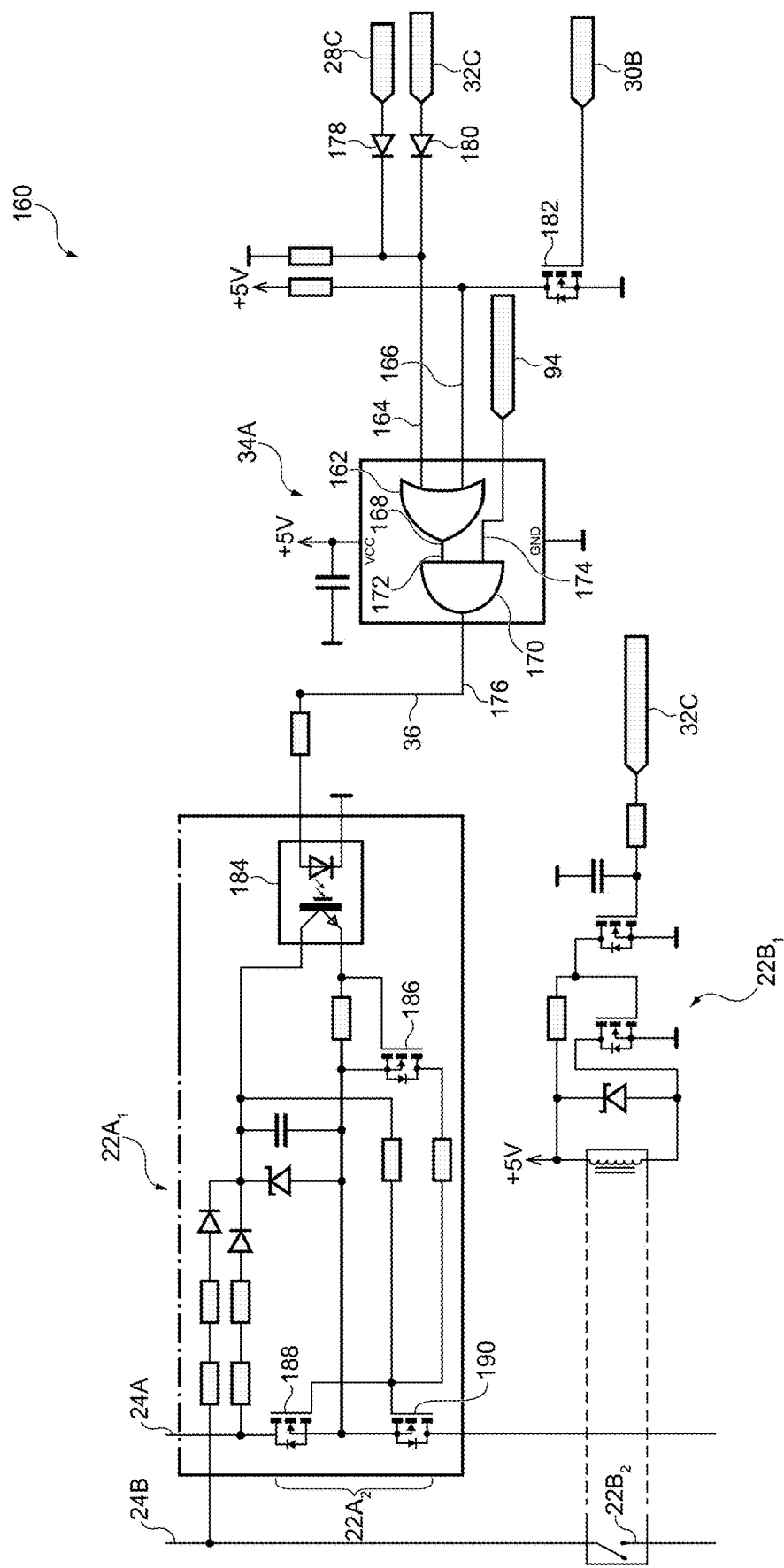
FIG. 9 is a diagram of a control logic circuit in accordance with an embodiment of the present technology.

FIG. 9 is a diagram of a control logic circuit 160 in accordance with an embodiment of the present technology. Inputs to the control logic circuit 160 include the fault signals 28C, 30B and 32C, and the sector presence indication 94 (FIG. 5). The logic combiner 34A as shown is an OR-AND gate, for example a SN74LVC1G3208 from Texas Instruments™. The logic combiner 34A includes an OR gate 162 having inputs 164, 166 and an output 168. The logic combiner 34A also includes an AND gate 170 having inputs 172, 174 and an output 176.

At least one of the fault signal 28C, indicative that the high current limit has been exceeded, or the fault signal 32C, indicative that the maximum differential current set-point has been exceeded, when present, takes the form of a voltage that passes through a diode 178 or 180 and is applied to the input 164 of the OR gate 162. The fault signal 30B, indicative that the configurable current limit has been exceeded, is applied at the gate of a transistor 182. The fault signal 30B, when present, takes the form of a low voltage that disables the transistor 182, allowing the +5 VDC tension to be applied at the input 166 of the OR gate 162. In the presence of any of the fault signals 28C, 32C or 30B, or in the presence of a combination of any of these fault signals, the output 168 of the OR gate 162 is set an applied at the input 172 of the AND gate 170. The sector presence indication 94 is applied to the other input 174 of the AND gate 170. The output 176 of the AND gate 170 is not set when the sector presence indication 94 reveals that the output circuit 14 is not connected to the AC power source. In the presence of one or more of the fault signals 28C, 32C and 30B and when the sector presence indication 94 shows that the PDU 10 is connected to the AC power source, the logic combiner 34A issues the disabling signal 36, which is applied to the first relay $22A_1$. An optocoupler 184 of the first relay $22A_1$ isolates the logic combiner 34A and the various sources of the fault signals 38C, 30B and 32C from the live lead 24A and the neutral lead 24B of the internal power line 24. When the disabling signal 36 is set, the optocoupler 184 becomes conductive, applying a signal on a gate of a transistor 186, which becomes conductive. In turn, conductivity of the transistor 186 causes forwarding of the disabling signal 36 to gates of transistors 188 and 190 that form the contactor $22A_2$, which becomes non-conducting, effectively stopping current conduction on the live lead 24A.

The current sensor 102, the current detection circuit 110, the latch 34B, the logic combiner 34A, the first relay $22A_1$ and its contactor $22A_2$ of the output circuit react quickly to changes to the current flowing into the load via the live lead 24A. In laboratory tests, opening of the transistors 188, 190 took 23 microseconds from an increase of the current in the live lead 24A above the high current limit. The current only flows through the current sensor 102 and through the transistors 188, 190 of the contactor $22A_2$, all of which generate minimal power losses.

The fault signal 32C from the high differential current detector 32B is also applied to the second relay $22B_1$ that, when energized, opens the contactor $22B_2$ that becomes non-conducting, effectively stopping current conduction on the neutral lead 24B. The second contactor $22B_2$ does not generate any noticeable power loss when closed.

Figure 10:
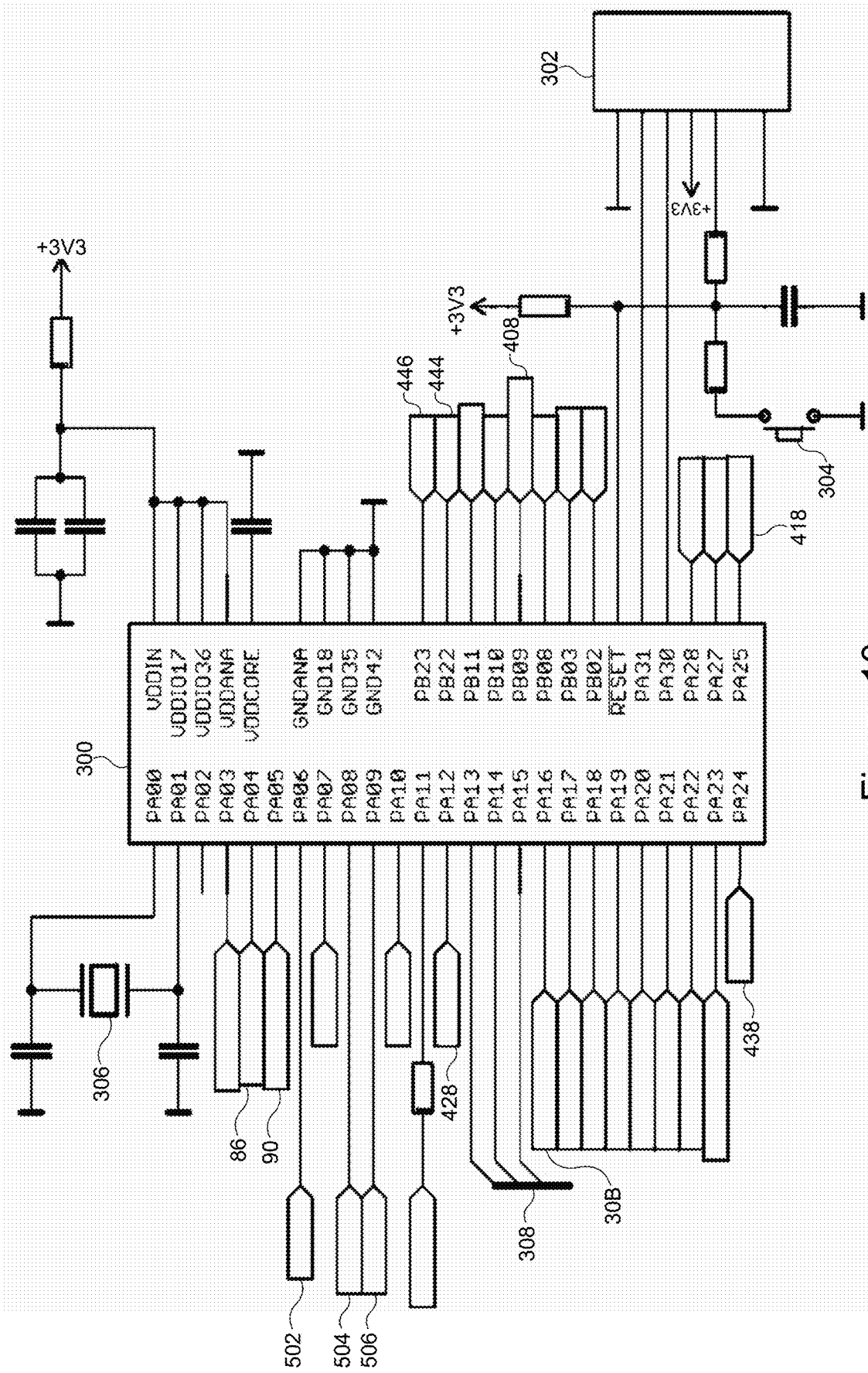
FIG. 10 is a diagram of a controller and of connections thereto in accordance with an embodiment of the present technology.

FIG. 10 is a diagram of a controller 300 and of connections thereto in accordance with an embodiment of the present technology. The controller 300 is an example implementation of the controller 42 of FIG. 1. The controller 300 may for example be an ATSAMD20G microprocessor from Microchip™, or any other processor adapted to support the features described herein. Adaptations of connections to another processor may become necessary when using other processors. Such adaptations are believed to be within the capabilities of the person of ordinary skill in the art of processor use and programming.

The controller 300 includes several analog and digital pins identified with the letters "PA" or "PB" and with respective numbers, as well as input power pins, ground pins and a reset pin. An external connector 302 controlled by a pushbutton 304 is linked to the reset pin and to some other pins and allows programming the controller. It is powered by the +3 VDC tension. A crystal 306 is connected to pins PA00 and PA01 to provide a clock signal to the controller 300.

The output 86 of the zero crossing detector 80 (FIG. 5) applies a voltage proportional to the AC voltage of the sector to pin PA04. The output 90 of the zero crossing detector 80 informs the controller 300 of the timing of zero crossings via the pin PA05.

Figure 11:
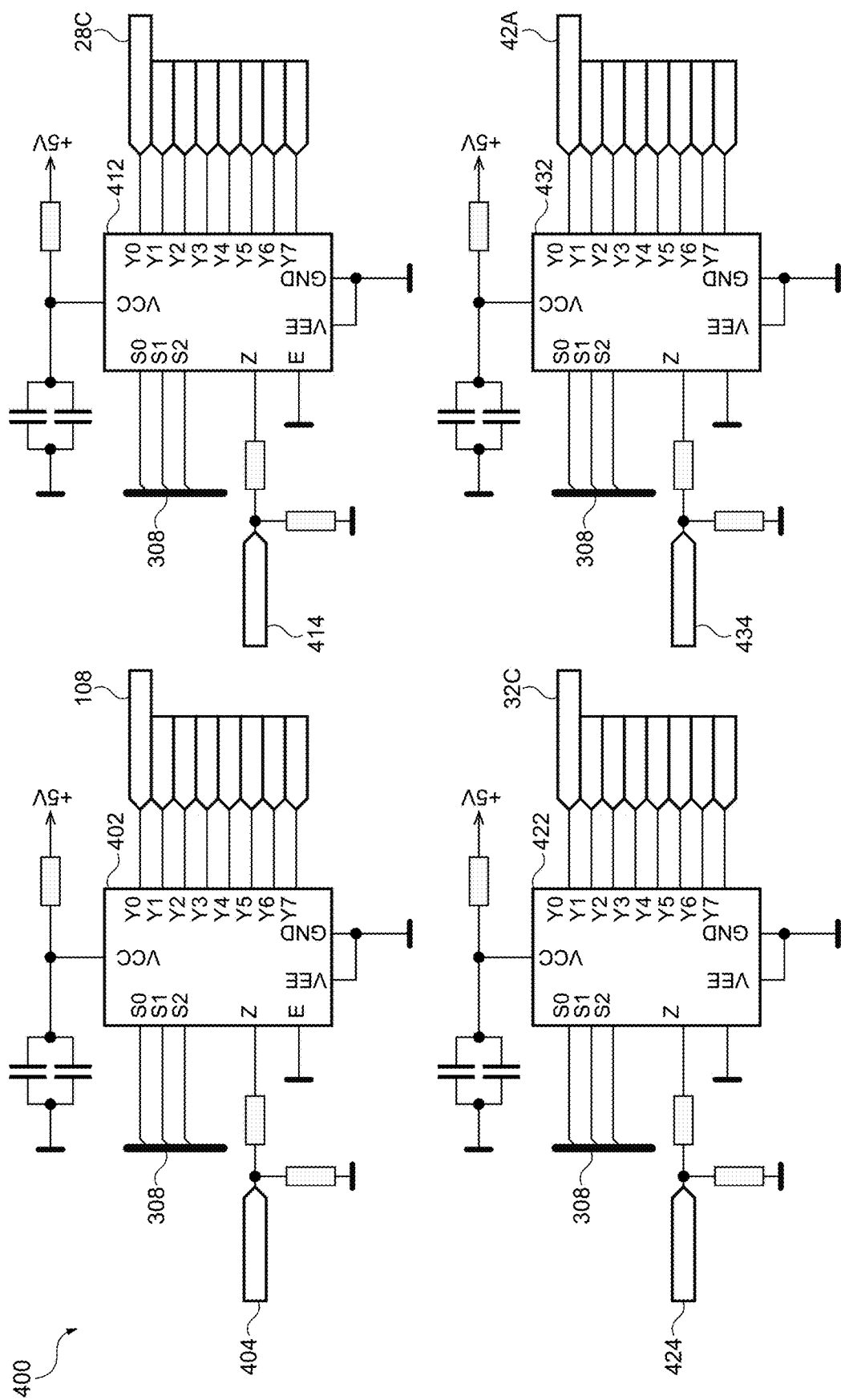
FIG. 11 is a diagram of a multiplexer/demultiplexer complex allowing communication between the power distribution unit and the controller in accordance with an embodiment of the present technology.

FIG. 11 is a diagram of a multiplexer/demultiplexer complex 400 allowing communication between the PDU 10 and the controller 300 in accordance with an embodiment of the present technology. The multiplexer/demultiplexer complex 400 implements the features of the internal bus 44 of FIG. 1. The multiplexer/demultiplexer complex 400 comprises four (4) multiplexer/demultiplexer 402, 412, 422 and 432, for example 74HCT4051 from Nexperia™, all of which are powered by the +5 VDC tension.

Referring at once to FIGS. 10 and 11, the multiplexer/demultiplexer 402 is used to multiplex signals from the output 108 of the current sensor 102 (FIG. 6) of a first output circuit 14, received at an input Y0 of the multiplexer/demultiplexer 402, and from similar outputs from other output circuits of the PDU 10, received at inputs Y1-Y7. In the non-limiting example of FIGS. 10 and 11, the controller 300 and the multiplexer/demultiplexer complex 400 are adapted to control the PDU 10 having eight (8) distinct output circuits such as the output circuit 14. A PDU having a different number of output circuits is also contemplated.

The controller 300 provides a 3-bit signal 308 from its pins PA13, PA14 and PA15 to cause the multiplexer/demultiplexer 402 to select one signal from the output 108 or from another of the output circuits of the PDU 10 for transmission to the controller 300. The selected signal, which is representative of a load current, or more generally representative of a power level, for a selected one of the output circuits of the PDU 10, is presented at an output 404 of the multiplexer/demultiplexer 402. This output 404 is applied as an analog load current value 408 to pin PB09 of the controller 300. Instead of the output 108 of the current sensor 102, receiving at the multiplexer/demultiplexer 402 power level measurements from a power level meter (not shown) is also contemplated.

The multiplexer/demultiplexer 412 is used to multiplex the fault signal 28C, indicative that the high current limit has been exceeded, from the first latch 34B (FIG. 7) of the first output circuit 14 and from similar latches from other output circuits of the PDU 10. The controller 300 provides the 3-bit signal 308 from its pins PA13, PA14 and PA15 to cause the multiplexer/demultiplexer 412 to select one fault signal 28C from the first latch 34B or from a latch of another one of the output circuits of the PDU 10 for transmission to the controller 300. The selected signal, which is an indication of an overcurrent for a selected one of the output circuits of the PDU 10, is presented at an output 414 of the multiplexer/demultiplexer 412. This output is applied as an overcurrent fault signal 418 to pin PA25 of the controller 300.

The multiplexer/demultiplexer 422 is used to multiplex the fault signal 32C, indicative that the maximum differential current set-point has been exceeded, from the second latch 34C (FIG. 8) of the first output circuit 14 and from similar latches from other output circuits of the PDU 10. The controller 300 provides the 3-bit signal 308 from its pins PA13, PA14 and PA15 to cause the multiplexer/demultiplexer 422 to select one fault signal 32C from the second latch 34C or from a latch of another one of the output circuits of the PDU 10 for transmission to the controller 300. The selected signal, which is an indication of a differential overcurrent for a selected one of the output circuits of the PDU 10, is presented at an output 424 of the multiplexer/demultiplexer 412. This output is applied as a differential overcurrent fault signal 428 to pin PA12 of the controller 300.

The controller 300 analyses its various inputs, including the AC voltage of the sector read at pin PA04, the timing of the zero crossings of the AC voltage of the sector read at pin PA05, and the load current values that are read sequentially from the various output circuits of the PDU 10 and acquired by the controller 300 at pin PB09. The controller 300 considers the load current for a given one of the output circuits, as reported for example from the output 108 of the current sensor 102 (FIG. 6) of the first output circuit 14 and presented to pin PB09 of the controller 300. This load current is compared to a configurable current value of the given one of the output circuits. If the configurable value is exceeded, the controller 300 sends a fault signal to the given one of the output circuits. For example, the fault signal 30B may be sent from pin PA16 of the controller 300 and be received at the control logic circuit 160 (FIG. 9) of the output circuit 14. The controller 300 may optionally synchronize the fault signal 30B with zero crossing detections of the AC power source, received at its pin PA05. As illustrated, the fault signal 30B is sent directly from the controller 300 to the control logic circuit 160 in order to ease synchronization. Similar fault signals may be sent by the controller 300 to other output circuits directly from it pins PA17-PA23. It is contemplated that the controller 300 may sent signals from its pins PA16-PA23 to the various output circuits of the PDU 10 in the absence of a fault, to disable any one of the output circuits for maintenance or for other reasons.

Figure 12:
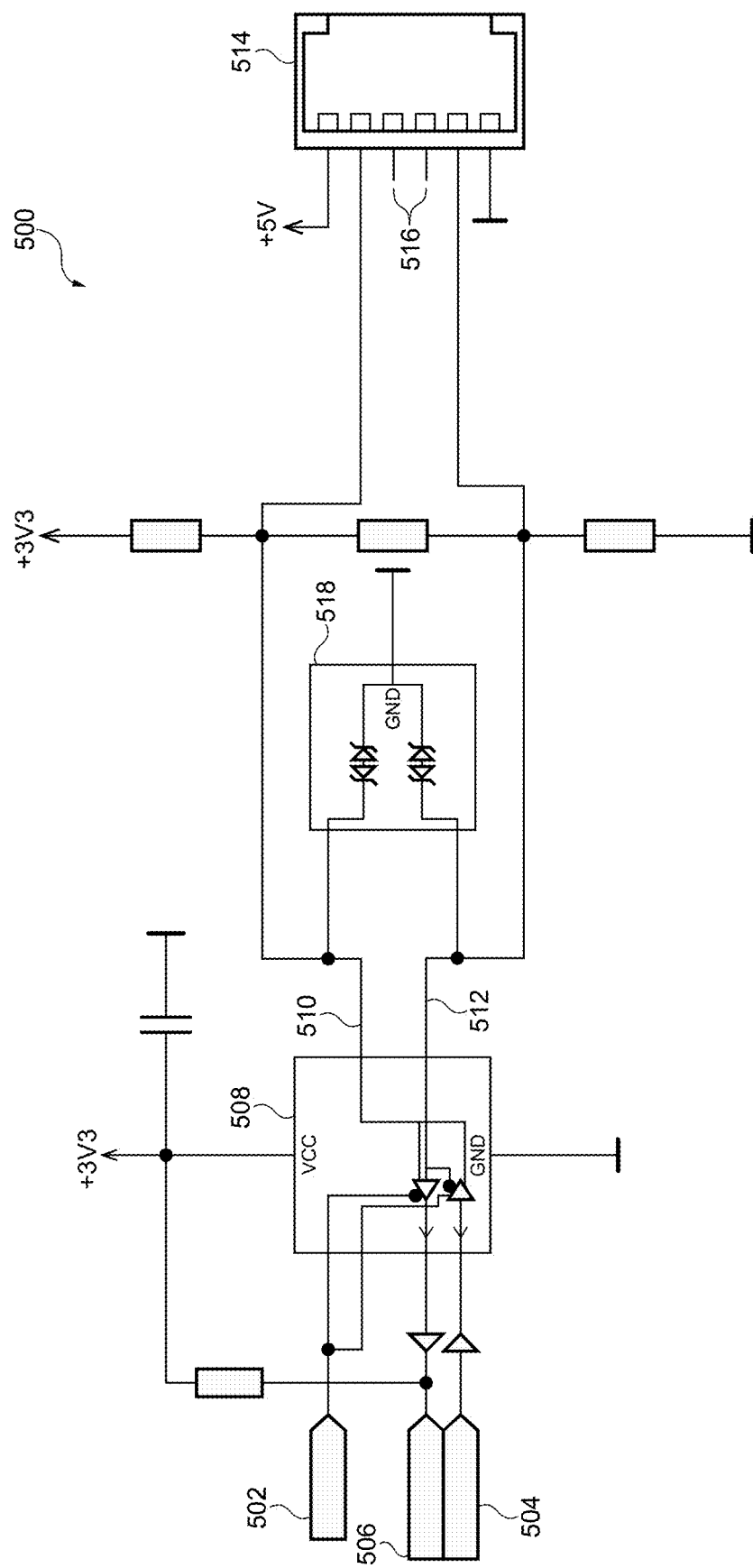
FIG. 12 is a diagram of a transceiver circuit allowing communication between the controller and other devices in accordance with an embodiment of the present technology.

Whether one of the output circuits of the PDU 10 has been disabled by autonomous action of that output circuit or as a result of the controller 300 issuing a fault command, information about the status of the output circuit is provided to a user of the PDU 10 on the user interface 48 (FIG. 1). Without limitation, the controller 400 and the user interface 48 may be connected via a RS-485 connection over a local network link. FIG. 12 is a diagram of a transceiver circuit 500 allowing communication between the controller 300 and other devices in accordance with an embodiment of the present technology. The transceiver circuit 500 comprises a transceiver 508, for example an ISL83483IBZ-T RS-485 transceiver from Renesas™, powered by the +3.3 VDC tension, and connected to the controller via a direction indicator 502 linked to pin PA06, a transmit connection 504 linked to pin PA08 and a receive connection 506 linked to pin PA09. Outputs 510 and 512 of the transceiver 508 are applied to an external connector 514 adapted to be connected on a communication link via terminals 516. The outputs 510 and 512 are also connected to a surge suppressor 518, for example a SM712-TPMSCT-ND from Micro Commercial Components™, mounted in parallel to the external connector 514. The controller 300 can cause the transceiver circuit 500 to transmit data from the transmit connection 504 when the direction indicator 502 is set. The controller 300 may receive data over the receive connection 506 when the direction indicator 502 is reset.

A non-limiting example of data that may be exchanged using the transceiver circuit 500 includes power measurements, voltage measurements, current measurements, and output circuit statuses sent from the controller 300 to the user interface 48. Following the reporting of a fault, the user of the PDU 10 may correct the situation having caused the fault and enter, on the user interface 48, a restart command for the failed output circuit. The restart command and an identity of the output circuit intended to be restarted is received via the transceiver circuit 500 and presented at the receive connection 506 to pin PA09 of the controller 300. The controller sets the 3-bit signal 308 to the appropriate value for the selected output circuit and sets a clear indication 438 at pin PA24. This clear indication is presented at an input 434 of the multiplexer/demultiplexer 432. In turn, the multiplexer/demultiplexer 432 issues a rearm signal at one of its outputs Y0-Y7, for example issuing the rearm signal 42A received at the first and second latches 34B, 34C (FIGS. 2, 7 and 8) to remove the issuance of the fault signals 28C and 32C. The controller 300 internally removes the issuance of the fault signal 30B (FIGS. 2, 9) at the same time, if previously set. All fault signals having been removed, the output circuit 14 and the load attached thereto are energized again by the AC power source.

The controller 300 may be connected to the PLC modem 46 via its pins PB22 and PB23 that respectively provide a PLC transmitting port 444, and a PLC receiving port 446. Data exchanged between the PDU 10 and other devices using the PLC protocol may include, for example and without limitation, power levels, voltages, currents and statuses of the PDU 10 and/or of any one of its output circuits. Such data may be used, for example, for analysis, diagnostic and planning purposes for a large data center.

Other connections may be made to various pins of the controller 300, for test, programming and debugging purposes. Such details are outside of the scope of the present disclosure and may be obtained for example by reference to a datasheet for the SAM D20 Family of microprocessors available from Microchip™.

Figure 13:
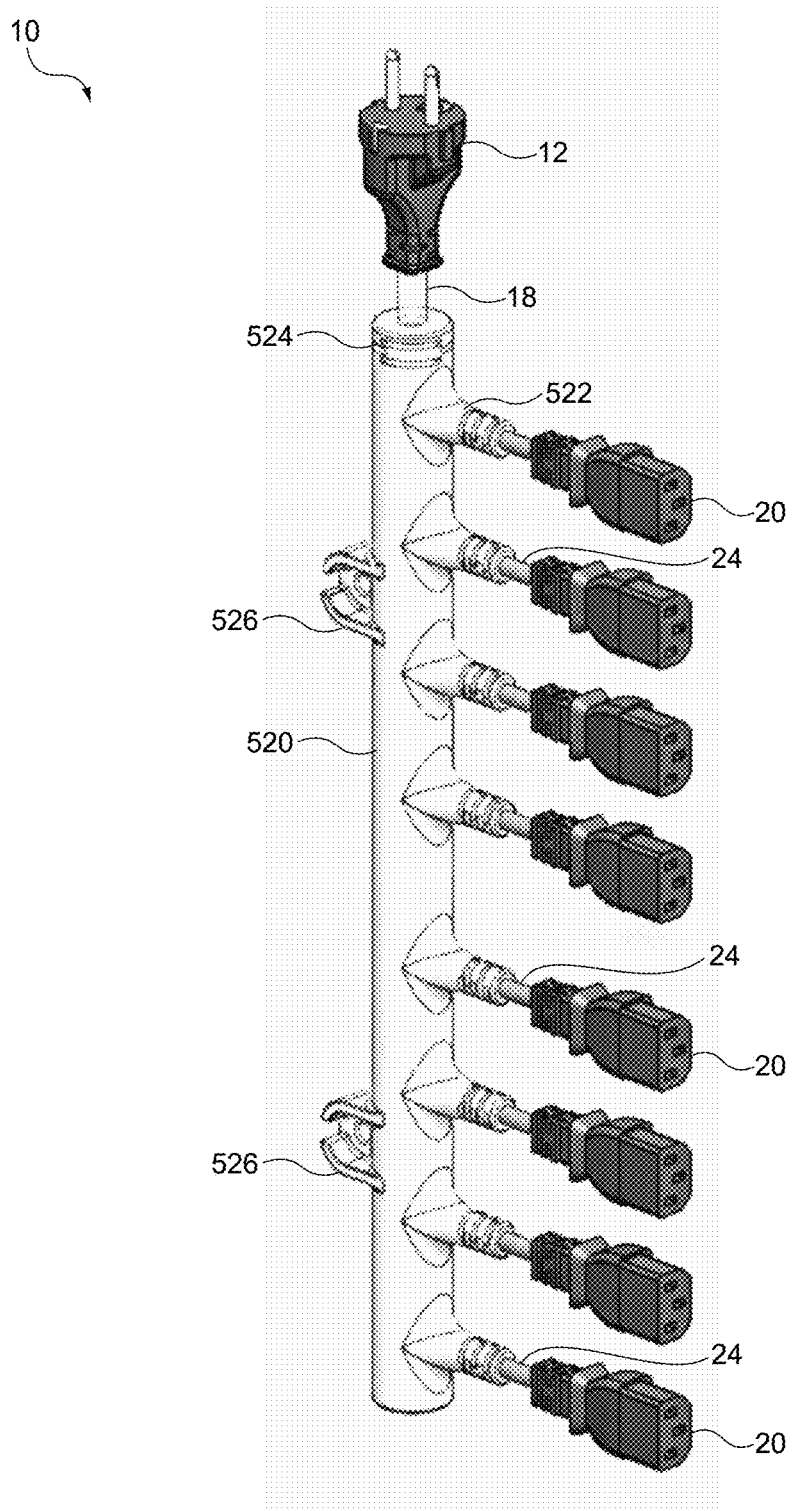
FIG. 13 is a perspective view of a power distribution unit in accordance with an embodiment of the present technology.

FIG. 13 is a perspective view of the PDU 10 in accordance with an embodiment of the present technology. The PDU 10 is shown with the input connector 12 that, as illustrated and without limitation, is a CEE 7-type plug for use in European countries, and with the output connectors 20 that, as illustrated and without limitation, are C13-type plugs. In the non-limiting example of FIG. 13, the shown PDU 10 includes eight (8) output connectors 20. The output circuits 14 for each of the output connectors 20, the controller 42 and, more generally, the various components shown and described in FIGS. 1-12 are contained in a body 520, which may be manufactured from a flame-retardant plastic material. Cables, for example 3G2.5 mm2 cables, form the lines 18 and 24 introduced in the description of FIG. 1. These lines may be of various lengths so the representation of FIG. 13 is solely for illustration purposes. Light emitting diodes (LED) (not shown) may be inserted within nipples 522 from which the lines 24 extend from the body 520 of the PDU 10. The material forming the nipples 522 is transparent or at least translucent in order to allow visual indications from the LEDs to be externally distinguishable. For example, the LED within the nipple 522 leading to a particular output connector 20 may be green when power is available at that output connector 20 and may be red when that output connector 20 is disconnected from the input connector 10 by the corresponding output circuit 14. An additional LED may be inserted in the body 520, at an entry point 524 of the power line 18, the additional LED providing a visual indication that AC power is available at the PDU 10. Brackets 526 may be provided to allow mounting the PDU 10 on an external support (not shown).

Figure 14A:
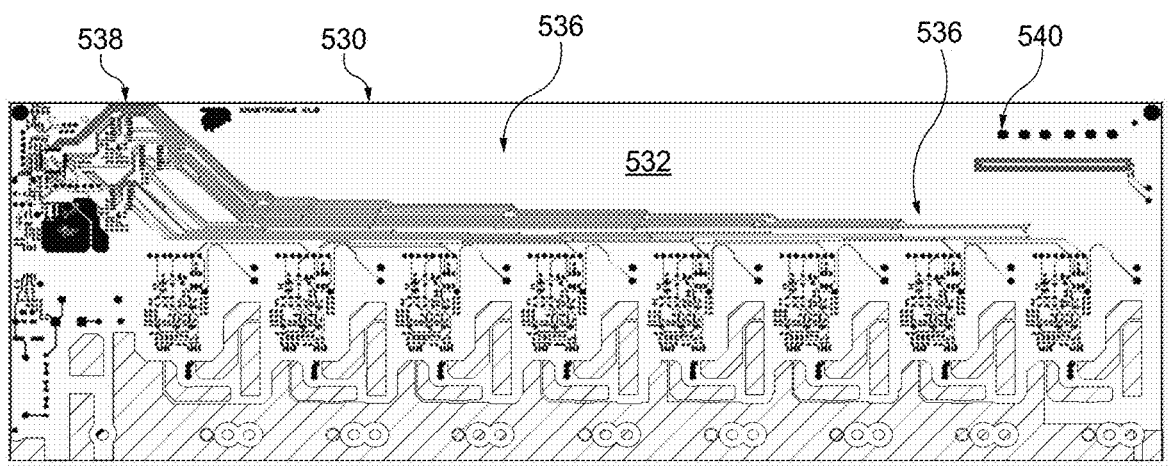
FIGS. 14a and 14b are, respectively, top and bottom plan views of a printed circuit board integrated in a power distribution unit in accordance with an embodiment of the present technology.
Figure 14B:
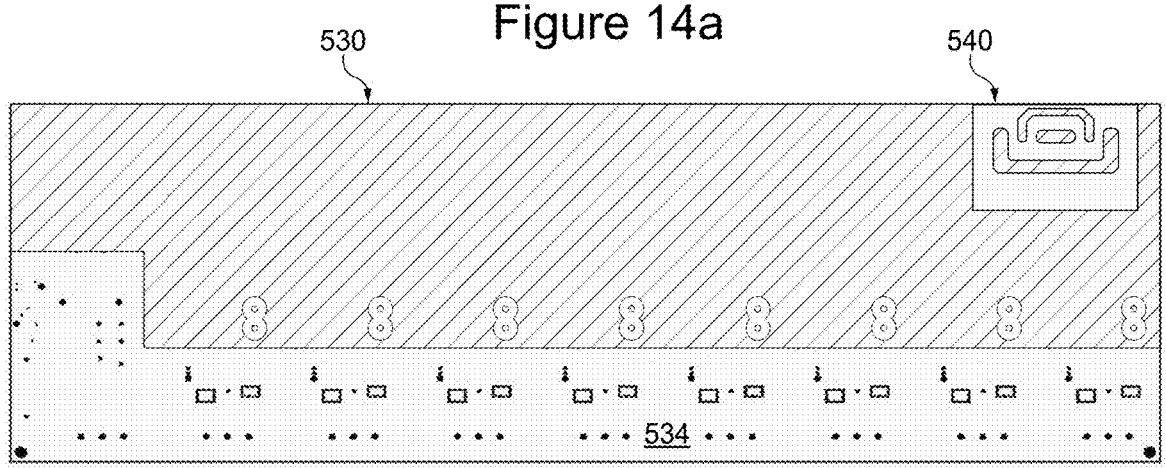
Figure 15:
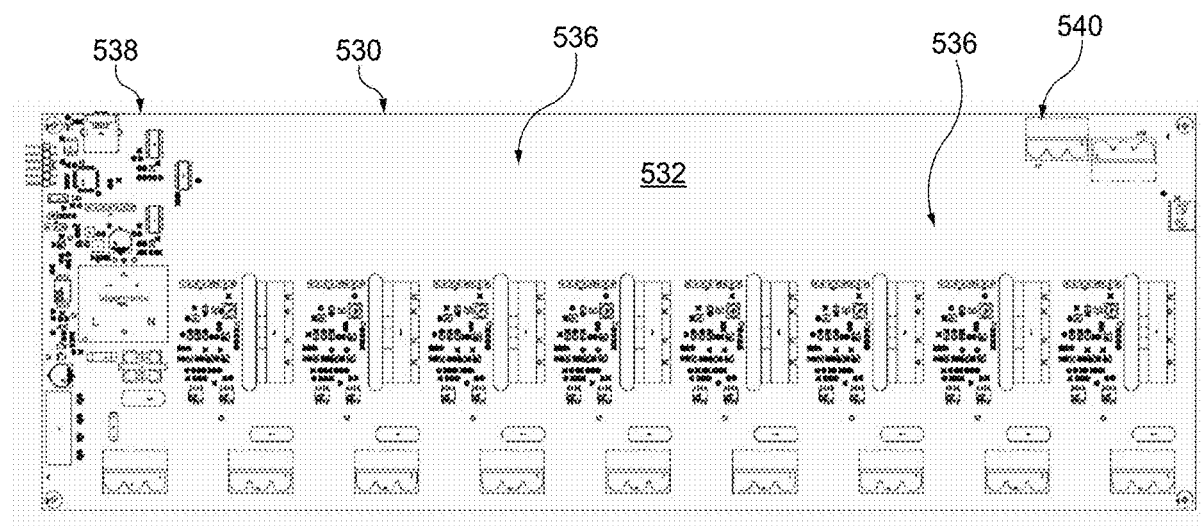
FIG. 15 is a schematic layout of components of a power distribution unit mounted on a printed circuit board in accordance with an embodiment of the present technology.

FIGS. 14*a* and 14*b* are, respectively, top and bottom plan views 532 and 534 of a printed circuit board (PCB) 530 integrated in the PDU 10 in accordance with an embodiment of the present technology. FIG. 14*a* shows that the top 532 contains eight (8) areas 536 that each correspond to one channel of the PDU 10 and include one instance of the output circuit 14. Components of the PDU 10 that are not specific to any particular output circuit 14, including for example the controller 42, are for the most part located in an area 538 of the PCB 530, with the exception that the input connector 12 that is mounted to an area 540 of the PCB 530. The bottom 534 of the PCB 530 shown on FIG. 14*b* contains a large ground plane 542. FIG. 15 is a schematic layout of components of the PDU 10 mounted on PCB 530 in accordance with an embodiment of the present technology.

Figure 16:
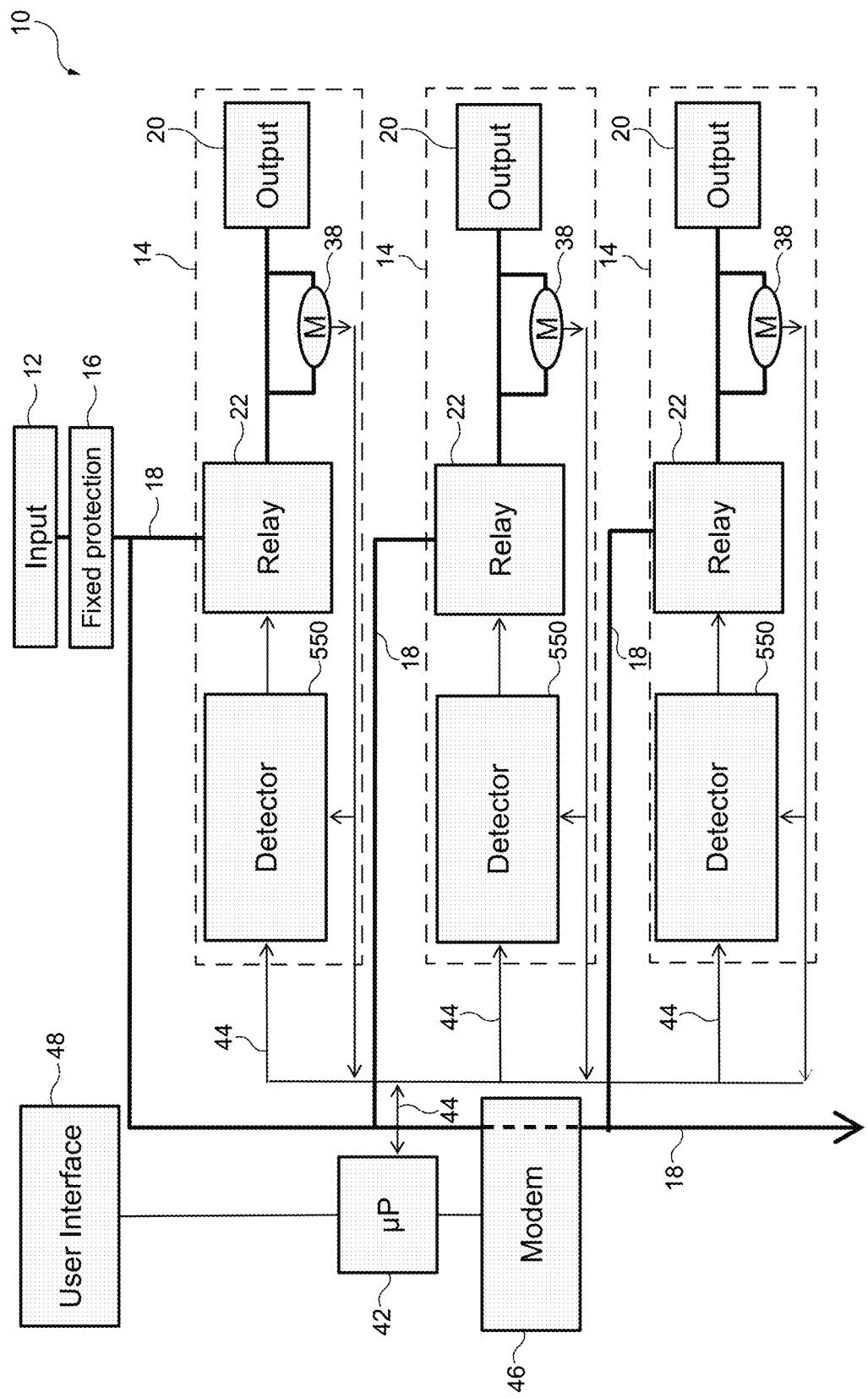
FIG. 16 is a high level schematic diagram of a power distribution unit in accordance with an embodiment of the present technology.

FIG. 16 is a high-level schematic diagram of the PDU 10 in accordance with an embodiment of the present technology. The PDU 10 of FIG. 1 is reproduced on FIG. 16, however highlighting some of its other features. The PDU 10 is shown including the input connector 12, the fixed protection 16, the controller 42, the communication bus 46, and three (3) channels that each includes an instance of the output circuit 14. The PDU 10 may include more of less than the three (3) channels as illustrated on FIG. 16. Each channel includes a respective output connector 20, a respective relay 22, a respective sensor 38, and a respective detector 550 that, in each output circuit 14, combines the various components of the detection sub-circuit 26 and of the combining logic 34 of FIG. 1. The detectors 550 and the relays 22 of all the channels of the PDU 10 together selectively connect the input connector 12 to each of the plurality of output connectors 20.

In each channel the detector 550, being operatively connected to the relay 22 and to the sensor 38, may generate a first fault signal when the power level reported by the sensor 38 exceeds a high power limit, or a second fault signal when a maximum differential current set-point is exceeded. The detector 550 has a latch function to maintain the first or second fault signal until it receives a rearm signal from the controller 42. The controller 42 may individually provide the rearm signal to any one of the detectors 550 of the PDU 10.

The controller 42 receives the power level reported by the sensor 38 of each channel, either directly or by calculating the power level based on a voltage, current, or like measurement reported by the sensor 38. The controller 42 may assign a power threshold to the output connectors 20 of all channels of the PDU 10, the power threshold being calculated by the controller 42 so that a sum of the power thresholds of the output connectors 20 does not exceed a maximum rated power for the PDU 10, this maximum rated power being for example consistent with the 15-ampere limit of the fixed protection 16. The power threshold for each output connector 20 may take the form of a configurable current limit enforced by the controller 42. The controller 42 may issue a third fault signal causing a respective relay 22 of PDU 10 to disconnect one of the output connectors 20 from the input connector 12 if the power level delivered by that output connector 20 exceeds its assigned power threshold.

Once a given one of the output connectors 20 has been disconnected from the input connector 12, whether the disconnection was caused by the controller 42 or by the relay 550, the controller 42 may receive a user command to activate again the given one of the output connectors 20. In response, the controller 42 may reset the third fault signal if previously set, and forward the rearm signal to the detector 550. This action unlatches the detector 550 that removes the first and/or second fault signal applied to the relay 22, allowing a reconnection of the output connector 20 to the input connector 12.

Figure 17:
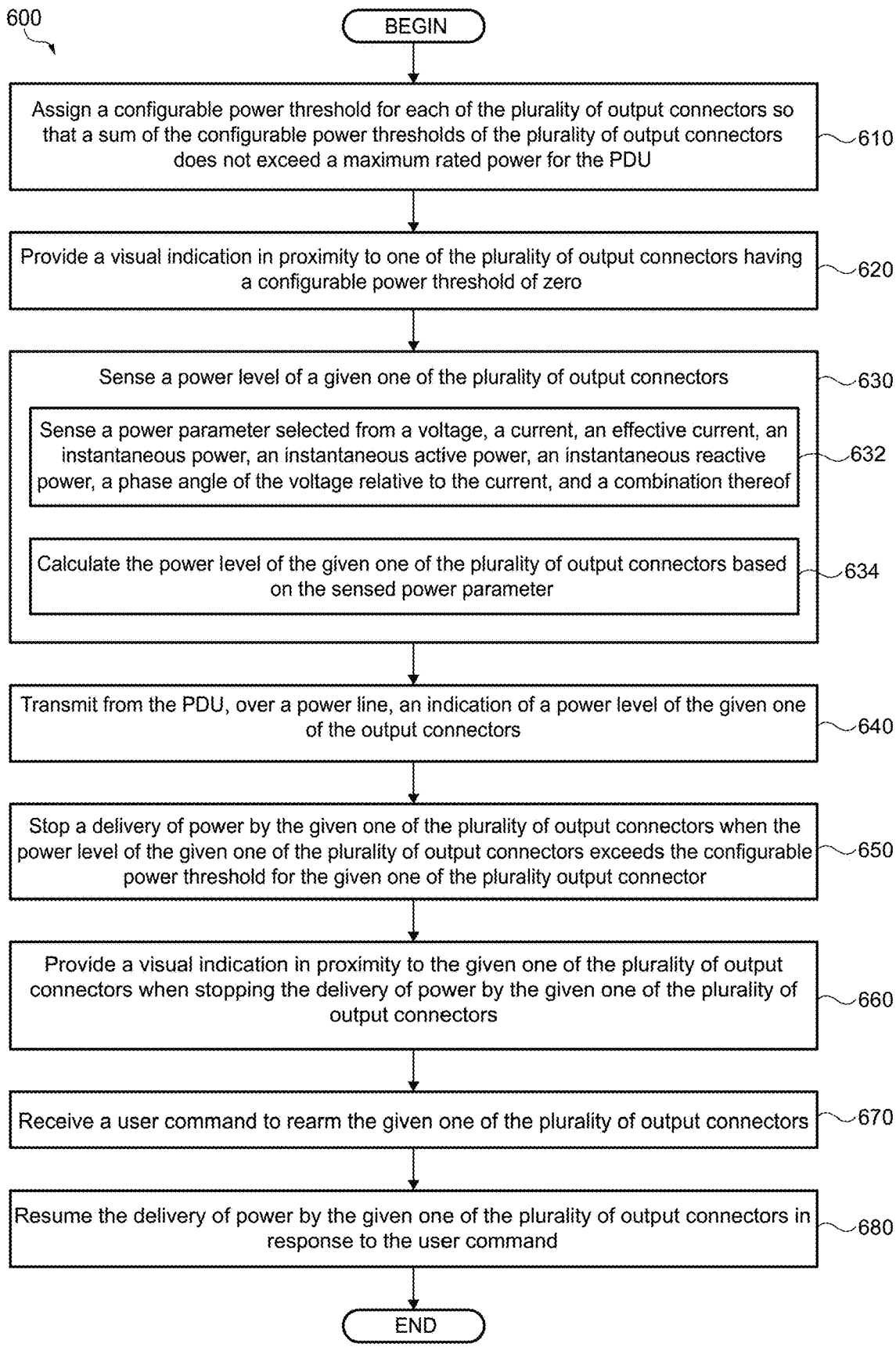
FIG. 17 is a sequence diagram showing operations of a method of limiting a total power delivered by a power distribution unit having a plurality of output connectors in accordance with an embodiment of the present technology.

FIG. 17 is a sequence diagram showing operations of a method of limiting a total power delivered by the PDU 10 having a plurality of output connectors 20 in accordance with an embodiment of the present technology. On FIG. 17, a sequence 600 comprises a plurality of operations that may be executed in variable order, some of the operations possibly being executed concurrently, some of the operations being optional.

A power threshold is assigned for each of the plurality of output connectors 20 at operation 610 so that a sum of the power thresholds of the plurality of output connectors 20 does not exceed a maximum rated power for the PDU 10. The power thresholds may be assigned by the controller 42. Different power thresholds may be assigned to distinct ones of the output connectors 20. Assigning the power threshold for each of the plurality of output connectors 20 may for example comprise configuring a current limit for each of the plurality of output connectors 20. At operation 620, a visual indication may be provided in proximity to one of the plurality of output connectors 20 having a power threshold of zero. The visual indication may for example be provided by turning on a LED to show a selected color.

A power level of a given one of the plurality of output connectors 20 is sensed at operation 630. This operation 630 may comprise sub-operation 632 in which a power parameter including one or more of a voltage, a current, an effective current, an instantaneous power, an instantaneous active power, an instantaneous reactive power, and a phase angle of the voltage relative to the current is sensed, and sub-operation 634 in which the power level of the given one of the plurality of output connectors 20 is calculated based on the sensed power parameter or parameters. In an embodiment, the current sensor 102 measures a load current flowing through the live lead 24A and provides this measurement to the controller 42 that, in turn, calculates the power level for the given one of the plurality of output connectors 20.

The PDU 10 may transmit, over a communication bus, an indication of a power level of the given one of the output connectors 20 at operation 640. This indication may be transmitted over the communication bus using the PLC protocol.

At operation 650, a delivery of power by the given one of the output connectors 20 may be stopped if the power level of that output connector 20 exceeds its assigned power threshold. The power delivery may be stopped, for example, by the controller 42 comparing the sensed power level to the assigned power threshold for the given one of the output connectors 20 and emitting a fault signal, causing the relay 22 to disconnect the given output connector 20 from the input connector 12. At operation 660, another visual indication may be provided in proximity to that output connector 20 when the delivery of power by that output connector 20 is stopped. That visual indication may for example be provided by turning on the LED to show another color.

A user command to rearm the given output connector 20 may be received at the controller 42, from the user interface 48, at operation 670. In response to the user command, the controller 42 removes the fault signal applied on the relay 22 and the delivery of power by the given output connector 20 is resumed at operation 680 by reconnection of the given output connector 20 to the input connector 12 by the corresponding relay 22.

Figure 18:
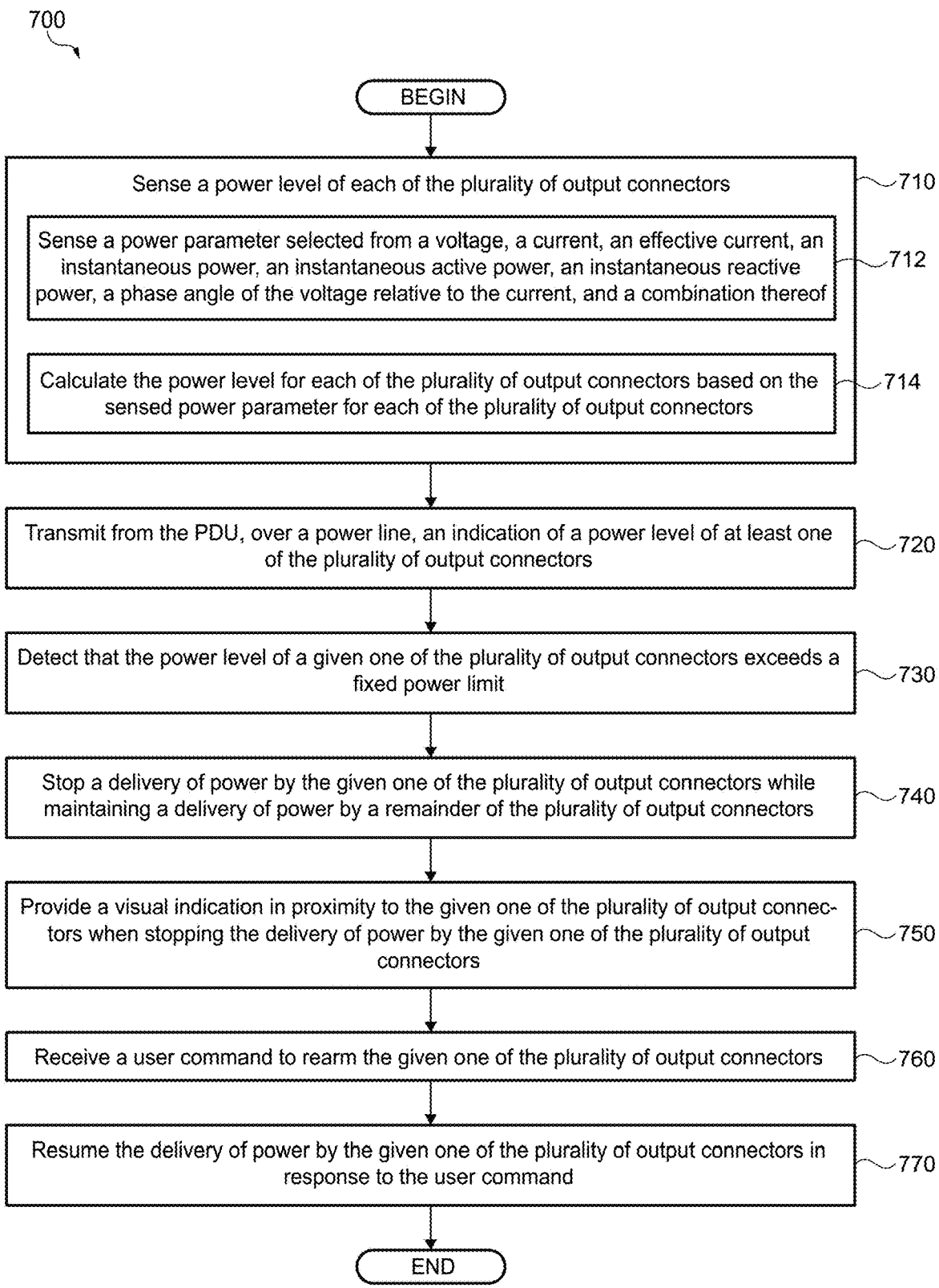
FIG. 18 is a sequence diagram showing operations of a method of preventing disjunctions in a power distribution unit having a plurality of output connectors in accordance with an embodiment of the present technology.

FIG. 18 is a sequence diagram showing operations of a method of preventing disjunctions in a PDU 10 having a plurality of output connectors 20 in accordance with an embodiment of the present technology. On FIG. 18, a sequence 700 comprises a plurality of operations that may be executed in variable order, some of the operations possibly being executed concurrently, some of the operations being optional.

A power level of each of the output connectors 20 of the PDU 10 is sensed at operation 710. This operation 710 may comprise sub-operation 712 in which a power parameter including one or more of a voltage, a current, an effective current, an instantaneous power, an instantaneous active power, an instantaneous reactive power and a phase angle of the voltage relative to the current is sensed, and sub-operation 714 in which the power level for each of the output connectors 20 is calculated based on the sensed power parameter for each of the output connectors 20. In an embodiment, the current sensor 102 measures a load current flowing through the live lead 24A and provides this measurement to the controller 42 that, in turn, calculates the power level for the given one of the plurality of output connectors 20.

The PDU 10 may transmit, over a communication bus, an indication of a power level of at least one of the output connectors 20 at operation 720. This indication may be transmitted over the communication bus using the PLC protocol.

At operation 730, it may be detected that the power level of a given output connector 20 exceeds a high power limit. This detection may be made, for example, by the detector 550 comparing the current flowing through the live lead 24A to a fixed high current limit. In response to the detection, a delivery of power by the given output connector 20 may be stopped at operation 740. To this end, the detector 500 may issue a fault signal to the breaker 22 and maintain that fault signal until a rearm signal is eventually received. A delivery of power by a remainder of the output connectors 20 is maintained when the delivery of power by the given output connector 20 is stopped. A visual indication may be provided at operation 750 in proximity to the given output connector 20 when stopping the delivery of power by that output connector 20.

The rearm signal may be received at operation 760, the rearm signal being for example provided by the controller 42 to the detector 550 corresponding to the given output connector 20 when the controller 42 receives a user command from the user interface 48. In response to the rearm signal, the detector 550 removes the fault signal applied to the corresponding relay 22. The delivery of power by the given output connector 20 is resumed at operation 770 by reconnection of the given output connector 20 to the input connector 12 by the corresponding relay 22.

While the above-described implementations have been described and shown with reference to particular components of the output circuit 14, of the controller 42, and of the PDU 10, it will be understood that these components may be combined, sub-divided, or re-ordered without departing from the teachings of the present technology. Accordingly, the order and grouping of the components is not a limitation of the present technology.

It should be expressly understood that not all technical effects mentioned herein need to be enjoyed in each and every embodiment of the present technology.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method of limiting a total power delivered by a power distribution unit (PDU) servicing a plurality of circuits, each circuit having a corresponding output connector, the method comprising:

assigning a power threshold for each of the plurality of output connectors;

sensing a power level of a given one of the plurality of output connectors;

detecting when the power level of the given one of the plurality of output connectors exceeds a fixed power limit and generating a corresponding fault signal; and stopping a delivery of power to the given one of the plurality of output connectors, based on a corresponding fault signal, when the power level of the given one of the plurality of output connectors exceeds the assigned power threshold for the given one of the plurality of output connectors;

wherein the power thresholds for each of the plurality of output connectors are assigned so that a sum of the power thresholds assigned to the plurality of output connectors does not exceed a maximum rated power for the PDU, the maximum rated power of the PDU being less than a sum of power limits of the plurality of output connectors.

2. The method of claim 1, wherein sensing the power level of the given one of the plurality of output connectors comprises:

sensing a power parameter selected from a voltage, a current, an effective current, an instantaneous power, an instantaneous active power, an instantaneous reactive power, a phase angle of the voltage relative to the current, and a combination thereof; and calculating the power level of the given one of the plurality of output connectors based on the sensed power parameter.

3. The method of claim 1, further comprising providing a first visual indication in proximity to the given one of the plurality of output connectors when stopping the delivery of power to the given one of the plurality of output connectors.

4. The method of claim 1, further comprising providing a second visual indication in proximity to one of the plurality of output connectors having an assigned power threshold of zero.

5. The method of claim 1, wherein different power thresholds are assigned to at least a subset of the plurality of output connectors.

6. The method of claim 1, wherein assigning the power threshold for each of the plurality of output connectors comprises assigning a current limit for each of the plurality of output connectors.

7. The method of claim 1, further comprising transmitting from the PDU, over a power line, an indication of the power level of the given one of the plurality of output connectors.

8. The method of claim 7, wherein the indication of the power level of the given one of the plurality of output connectors is transmitted over the power line using a power line communication (PLC) protocol.

9. The method of claim 1, further comprising:

receiving a user command to rearm the given one of the plurality of output connectors; and resuming the delivery of power to the given one of the plurality of output connectors in response to the user command.

10. A power distribution unit (PDU), comprising:

an input connector;

a plurality of output connectors;

a plurality of circuits, each circuit being adapted to selectively connect the input connector to a corresponding one of the plurality of output connectors, each circuit comprising a sensor adapted to sense a power level of the corresponding one of the plurality of output connectors and a detector, operatively coupled to the sensor, configured to detect when a respective power level exceeds a fixed power limit and to generate a fault signal; and a controller operatively connected to the plurality of circuits, the controller being adapted to:

assign a power threshold to each of the plurality of output connectors, cause a disconnection of a given one of the plurality of output connectors from the input connector, based on a fault signal of the detector corresponding to one of the plurality of circuits when the power level of the given one of the plurality of output connectors exceeds the assigned power threshold for the given one of the plurality of output connectors, and assign the power thresholds to each of the plurality of output connectors so that a sum of the power thresholds assigned to the plurality of output connectors does not exceed a maximum rated power for the PDU, the maximum rated power of the PDU being less than a sum of power limits of the plurality of output connectors.

11. The PDU of claim 10, wherein:

the sensor of each of the plurality of circuits is selected from a voltmeter, an ammeter, a power meter and a combination thereof; and the controller is further adapted to calculate a power level of each of the output connectors based on a power parameter provided by the sensor.

12. The PDU of claim 10, wherein each of the plurality of circuits comprises a relay, the controller causing the relay of the corresponding one of the plurality of circuits to disconnect the given one of the plurality of output connectors from the input connector.

13. The PDU of claim 10, wherein the detector of each of the plurality of circuits enforces a same fixed power limit greater than any one of the assigned power thresholds.

14. The PDU of claim 10, further comprising a power line communication (PLC) protocol modem operatively connected to the controller and adapted to transmit an indication of the power level of at least one of the output connectors over a power line connected to the input connector.

15. The PDU of claim 10, further comprising a user interface operatively connected to the controller, wherein the controller is further adapted to:

receive a user command from the user interface; and cause the plurality of circuits to reconnect the given one of the plurality of output connectors to the input connector when receiving the user command from the user interface.

* * * * *